United States Patent
Walton et al.

(10) Patent No.: US 8,170,513 B2
(45) Date of Patent: May 1, 2012

(54) DATA DETECTION AND DEMODULATION FOR WIRELESS COMMUNICATION SYSTEMS

(75) Inventors: J. Rodney Walton, Carlisle, MA (US); Mark S. Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1293 days.

(21) Appl. No.: 10/692,833

(22) Filed: Oct. 23, 2003

(65) Prior Publication Data

US 2004/0137863 A1   Jul. 15, 2004

Related U.S. Application Data

(60) Provisional application No. 60/421,309, filed on Oct. 25, 2002, provisional application No. 60/432,626, filed on Dec. 10, 2002, provisional application No. 60/432,440, filed on Dec. 10, 2002.

(51) Int. Cl.
H04B 17/00 (2006.01)
H04B 1/06 (2006.01)
H04B 7/00 (2006.01)
H04B 1/16 (2006.01)

(52) U.S. Cl. .................. 455/226.1; 455/277.2; 455/337; 375/324; 375/340

(58) Field of Classification Search .... 455/277.1–277.2, 455/226.1–226.3, 226.4, 227, 280, 296, 334, 455/337

See application file for complete search history.

(56) References Cited

U.S. PATENT DOCUMENTS

| | | | |
|---|---|---|---|
| 4,736,371 A | 4/1988 | Tejima et al. | |
| 4,750,198 A | 6/1988 | Harper | |
| 4,797,879 A | 1/1989 | Habbab | |
| 5,241,544 A | 8/1993 | Jasper et al. | |
| 5,295,159 A | 3/1994 | Kerpez | |
| 5,404,355 A | 4/1995 | Raith | |
| 5,471,647 A | 11/1995 | Gerlach et al. | |
| 5,479,447 A | 12/1995 | Chow et al. | |
| 5,493,712 A | 2/1996 | Ramesh et al. | |
| 5,506,861 A * | 4/1996 | Bottomley | 370/441 |

(Continued)

FOREIGN PATENT DOCUMENTS

AU     2002259221     11/2002

(Continued)

OTHER PUBLICATIONS

Alamouti, S.M., "A Simple Transmit Diversity Technique for Wireless Communications," IEEE Journal on Select Areas in Communications, vol. 16, No. 8, Oct. 1998, pp. 1451-1458.

(Continued)

*Primary Examiner* — Simon D Nguyen
(74) *Attorney, Agent, or Firm* — Qualcomm Patent Group; Thien T. Nguyen; James H. Yancey, Jr.

(57) ABSTRACT

Techniques for detecting and demodulating data transmissions in wireless communication systems. In one aspect, a decision-directed detector detects for data transmissions in a received signal by utilizing received data symbols as well as received pilot symbols. The decision-directed detector may be designed to perform differential detection in the frequency domain or coherent detection in the time domain, and may be used with multi-carrier modulation (e.g., OFDM). In another aspect, an adaptive threshold is used to perform detection of received data transmissions. A threshold may be determined for each data transmission hypothesized to have been received. The threshold may be computed, for example, based on the signal plus noise energy of the hypothesized data transmission.

27 Claims, 15 Drawing Sheets

U.S. PATENT DOCUMENTS

| | | | |
|---|---|---|---|
| 5,509,003 | A | 4/1996 | Snijders et al. |
| 5,606,729 | A | 2/1997 | D'amico |
| 5,638,369 | A | 6/1997 | Ayerst |
| 5,677,909 | A | 10/1997 | Heide |
| 5,729,542 | A | 3/1998 | Dupont |
| 5,790,550 | A | 8/1998 | Peeters et al. |
| 5,818,813 | A | 10/1998 | Saito et al. |
| 5,822,374 | A | 10/1998 | Levin |
| 5,832,387 | A | 11/1998 | Bae et al. |
| 5,867,478 | A | 2/1999 | Baum et al. |
| 5,867,539 | A | 2/1999 | Koslov |
| 5,886,988 | A | 3/1999 | Yun et al. |
| 5,959,965 | A | 9/1999 | Ohkubo et al. |
| 5,973,638 | A | 10/1999 | Robbins et al. |
| 5,982,327 | A | 11/1999 | Vook et al. |
| 6,049,548 | A | 4/2000 | Bruno |
| 6,072,779 | A | 6/2000 | Tzannes et al. |
| 6,084,915 | A | 7/2000 | Williams |
| 6,097,771 | A | 8/2000 | Foschini |
| 6,115,354 | A | 9/2000 | Weck |
| 6,122,247 | A | 9/2000 | Levin et al. |
| 6,131,016 | A | 10/2000 | Greenstein et al. |
| 6,141,388 | A * | 10/2000 | Servais et al. ............ 375/262 |
| 6,141,542 | A | 10/2000 | Kotzin et al. |
| 6,141,567 | A | 10/2000 | Youssefmir et al. |
| 6,144,711 | A | 11/2000 | Raleigh et al. |
| 6,163,296 | A | 12/2000 | Lier et al. |
| 6,167,031 | A | 12/2000 | Olofsson et al. |
| 6,178,196 | B1 | 1/2001 | Naguib et al. |
| 6,205,410 | B1 | 3/2001 | Cai |
| 6,222,888 | B1 | 4/2001 | Kao et al. |
| 6,232,918 | B1 | 5/2001 | Wax et al. |
| 6,266,528 | B1 | 7/2001 | Farzaneh |
| 6,275,543 | B1 | 8/2001 | Petrus et al. |
| 6,278,726 | B1 | 8/2001 | Mesecher et al. |
| 6,292,917 | B1 | 9/2001 | Sinha et al. |
| 6,298,035 | B1 | 10/2001 | Heiskala |
| 6,298,092 | B1 | 10/2001 | Heath, Jr. et al. |
| 6,308,080 | B1 | 10/2001 | Burt et al. |
| 6,314,113 | B1 | 11/2001 | Guémas |
| 6,314,289 | B1 | 11/2001 | Eberlein et al. |
| 6,317,612 | B1 | 11/2001 | Farsakh |
| 6,330,277 | B1 | 12/2001 | Gelblum et al. |
| 6,330,293 | B1 | 12/2001 | Klank |
| 6,330,462 | B1 | 12/2001 | Chen |
| 6,333,953 | B1 * | 12/2001 | Bottomley et al. ......... 375/316 |
| 6,339,399 | B1 | 1/2002 | Andersson et al. |
| 6,345,036 | B1 | 2/2002 | Sudo et al. |
| 6,346,910 | B1 | 2/2002 | Ito |
| 6,351,499 | B1 | 2/2002 | Paulraj et al. |
| 6,363,267 | B1 | 3/2002 | Lindskog et al. |
| 6,377,812 | B1 | 4/2002 | Rashid-Farrokhi et al. |
| 6,385,264 | B1 | 5/2002 | Terasawa et al. |
| 6,426,971 | B1 | 7/2002 | Wu et al. |
| 6,452,981 | B1 | 9/2002 | Raleigh et al. |
| 6,463,290 | B1 | 10/2002 | Stilp et al. |
| 6,473,467 | B1 | 10/2002 | Wallace et al. |
| 6,478,422 | B1 | 11/2002 | Hansen |
| 6,492,942 | B1 | 12/2002 | Kezys |
| 6,510,184 | B1 | 1/2003 | Okamura |
| 6,515,617 | B1 | 2/2003 | Demers et al. |
| 6,532,225 | B1 | 3/2003 | Chang et al. |
| 6,532,562 | B1 | 3/2003 | Chou et al. |
| 6,545,997 | B1 | 4/2003 | Bohnke et al. |
| 6,574,211 | B2 | 6/2003 | Padovani et al. |
| 6,574,267 | B1 | 6/2003 | Kanterakis et al. |
| 6,574,271 | B2 | 6/2003 | Mesecher et al. |
| 6,594,473 | B1 | 7/2003 | Dabak et al. |
| 6,594,798 | B1 | 7/2003 | Chou et al. |
| 6,597,682 | B1 | 7/2003 | Kari |
| 6,608,874 | B1 | 8/2003 | Beidas et al. |
| 6,611,231 | B2 | 8/2003 | Crilly, Jr. et al. |
| 6,631,121 | B1 | 10/2003 | Yoon |
| 6,636,496 | B1 | 10/2003 | Cho et al. |
| 6,636,568 | B2 | 10/2003 | Kadous |
| 6,654,590 | B2 | 11/2003 | Boros et al. |
| 6,654,613 | B1 | 11/2003 | Maeng et al. |
| 6,668,161 | B2 | 12/2003 | Boros et al. |
| 6,683,916 | B1 | 1/2004 | Sartori et al. |
| 6,690,660 | B2 | 2/2004 | Kim et al. |
| 6,693,992 | B2 | 2/2004 | Jones et al. |
| 6,697,346 | B1 | 2/2004 | Halton et al. |
| 6,728,233 | B1 | 4/2004 | Park et al. |
| 6,731,668 | B2 | 5/2004 | Ketchum |
| 6,735,188 | B1 | 5/2004 | Becker |
| 6,738,020 | B1 | 5/2004 | Lindskog et al. |
| 6,744,811 | B1 | 6/2004 | Kantschuk |
| 6,751,187 | B2 | 6/2004 | Walton et al. |
| 6,751,444 | B1 | 6/2004 | Meiyappan |
| 6,751,480 | B2 | 6/2004 | Kogiantis et al. |
| 6,757,263 | B1 | 6/2004 | Olds |
| 6,760,313 | B1 | 7/2004 | Sindhushayana et al. |
| 6,760,388 | B2 | 7/2004 | Ketchum et al. |
| 6,760,882 | B1 | 7/2004 | Gesbert et al. |
| 6,768,727 | B1 | 7/2004 | Sourour et al. |
| 6,771,706 | B2 | 8/2004 | Ling et al. |
| 6,785,341 | B2 | 8/2004 | Walton et al. |
| 6,785,513 | B1 | 8/2004 | Sivaprakasam |
| 6,788,948 | B2 | 9/2004 | Lindskog et al. |
| 6,792,041 | B1 | 9/2004 | Kim et al. |
| 6,795,424 | B1 | 9/2004 | Kapoor et al. |
| 6,798,738 | B1 | 9/2004 | Do et al. |
| 6,801,790 | B2 | 10/2004 | Rudrapatna et al. |
| 6,802,035 | B2 | 10/2004 | Catreux et al. |
| 6,804,191 | B2 | 10/2004 | Richardson |
| 6,821,535 | B2 | 11/2004 | Nurmi et al. |
| 6,847,828 | B2 | 1/2005 | Miyoshi et al. |
| 6,850,252 | B1 | 2/2005 | Hoffberg |
| 6,850,498 | B2 | 2/2005 | Heath et al. |
| 6,859,503 | B2 | 2/2005 | Pautler et al. |
| 6,862,440 | B2 | 3/2005 | Sampath |
| 6,868,079 | B1 | 3/2005 | Hunt |
| 6,873,651 | B2 | 3/2005 | Tesfai et al. |
| 6,879,578 | B2 | 4/2005 | Pan et al. |
| 6,879,579 | B1 | 4/2005 | Myles |
| 6,885,708 | B2 * | 4/2005 | Thomas et al. ............. 375/260 |
| 6,888,809 | B1 | 5/2005 | Foschini et al. |
| 6,888,899 | B2 | 5/2005 | Raleigh et al. |
| 6,891,858 | B1 | 5/2005 | Mahesh et al. |
| 6,920,192 | B1 | 7/2005 | Laroia et al. |
| 6,920,194 | B2 * | 7/2005 | Stopler et al. ............. 375/349 |
| 6,927,728 | B2 | 8/2005 | Vook et al. |
| 6,937,592 | B1 | 8/2005 | Heath, Jr. et al. |
| 6,940,917 | B2 | 9/2005 | Menon |
| 6,950,632 | B1 | 9/2005 | Yun et al. |
| 6,952,426 | B2 | 10/2005 | Wu et al. |
| 6,952,454 | B1 | 10/2005 | Jalali et al. |
| 6,956,813 | B2 | 10/2005 | Fukuda |
| 6,956,906 | B2 | 10/2005 | Tager et al. |
| 6,959,171 | B2 | 10/2005 | Tsien et al. |
| 6,963,742 | B2 | 11/2005 | Boros et al. |
| 6,965,762 | B2 | 11/2005 | Sugar et al. |
| 6,980,601 | B2 | 12/2005 | Jones |
| 6,980,800 | B2 | 12/2005 | Noerpel et al. |
| 6,985,434 | B2 | 1/2006 | Wu et al. |
| 6,985,534 | B1 | 1/2006 | Meister |
| 6,987,819 | B2 | 1/2006 | Thomas et al. |
| 6,990,059 | B1 | 1/2006 | Anikhindi et al. |
| 6,992,972 | B2 | 1/2006 | Van Nee |
| 6,996,380 | B2 | 2/2006 | Dent et al. |
| 7,003,044 | B2 | 2/2006 | Subramanian et al. |
| 7,006,464 | B1 | 2/2006 | Gopalakrishnan et al. |
| 7,006,483 | B2 | 2/2006 | Nelson, Jr. et al. |
| 7,006,848 | B2 | 2/2006 | Ling et al. |
| 7,009,931 | B2 | 3/2006 | Ma et al. |
| 7,012,978 | B2 | 3/2006 | Talwar |
| 7,020,110 | B2 | 3/2006 | Walton et al. |
| 7,020,490 | B2 | 3/2006 | Khatri et al. |
| 7,023,826 | B2 | 4/2006 | Sjoberg et al. |
| 7,031,671 | B2 * | 4/2006 | Mottier ...................... 455/101 |
| 7,035,359 | B2 * | 4/2006 | Molnar ...................... 375/346 |
| 7,039,125 | B2 | 5/2006 | Friedman |
| 7,058,367 | B1 | 6/2006 | Luo et al. |
| 7,062,294 | B1 | 6/2006 | Rogard et al. |
| 7,068,628 | B2 | 6/2006 | Li et al. |
| 7,072,381 | B2 * | 7/2006 | Atarashi et al. ............. 375/144 |
| 7,072,410 | B1 | 7/2006 | Monsen |

| Patent No. | Date | Inventor |
|---|---|---|
| 7,072,413 B2 | 7/2006 | Walton et al. |
| 7,088,671 B1 | 8/2006 | Monsen |
| 7,095,709 B2 | 8/2006 | Walton et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano et al. |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson et al. |
| 7,149,254 B2 | 12/2006 | Sampath |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,669 B2 | 1/2007 | Li et al. |
| 7,184,713 B2 | 2/2007 | Kadous et al. |
| 7,187,646 B2 * | 3/2007 | Schramm .................. 370/206 |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani (Nissensohn) et al. |
| 7,260,366 B2 | 8/2007 | Lee et al. |
| 7,263,119 B1 | 8/2007 | Hsu et al. |
| 7,274,734 B2 | 9/2007 | Tsatsanis |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 * | 10/2009 | Hsu et al. .................. 375/150 |
| 7,623,871 B2 | 11/2009 | Sheynblat |
| 7,636,573 B2 | 12/2009 | Walton et al. |
| 7,653,142 B2 | 1/2010 | Ketchum et al. |
| 7,653,415 B2 | 1/2010 | Van Rooyen |
| 7,986,742 B2 | 7/2011 | Ketchum et al. |
| 2001/0017881 A1 | 8/2001 | Bhatoolaul et al. |
| 2001/0031621 A1 | 10/2001 | Schmutz et al. |
| 2001/0046205 A1 | 11/2001 | Easton et al. |
| 2002/0003774 A1 | 1/2002 | Wang et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0064214 A1 | 5/2002 | Hattori et al. |
| 2002/0071445 A1 | 6/2002 | Wu et al. |
| 2002/0072336 A1 | 6/2002 | Mottier |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell |
| 2002/0126803 A1 | 9/2002 | Jones et al. |
| 2002/0127978 A1 | 9/2002 | Khatri |
| 2002/0132600 A1 | 9/2002 | Rudrapatna et al. |
| 2002/0154705 A1 | 10/2002 | Walton et al. |
| 2002/0163879 A1 | 11/2002 | Li et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0003863 A1 | 1/2003 | Thielecke et al. |
| 2003/0012308 A1 | 1/2003 | Sampath et al. |
| 2003/0039317 A1 | 2/2003 | Taylor et al. |
| 2003/0043887 A1 | 3/2003 | Hudson et al. |
| 2003/0045288 A1 | 3/2003 | Luschi et al. |
| 2003/0048856 A1 | 3/2003 | Ketchum et al. |
| 2003/0060173 A1 | 3/2003 | Lee et al. |
| 2003/0076797 A1 | 4/2003 | Lozano et al. |
| 2003/0076812 A1 | 4/2003 | Benedittis |
| 2003/0078024 A1 | 4/2003 | Magee et al. |
| 2003/0086514 A1 | 5/2003 | Ginis et al. |
| 2003/0092456 A1 | 5/2003 | Dent et al. |
| 2003/0095197 A1 | 5/2003 | Wheeler et al. |
| 2003/0099306 A1 | 5/2003 | Nilsson et al. |
| 2003/0112745 A1 | 6/2003 | Zhuang et al. |
| 2003/0119452 A1 | 6/2003 | Kim et al. |
| 2003/0123381 A1 | 7/2003 | Zhuang et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0128658 A1 | 7/2003 | Walton et al. |
| 2003/0139194 A1 | 7/2003 | Onggosanusi et al. |
| 2003/0139196 A1 | 7/2003 | Medvedev et al. |
| 2003/0147371 A1 | 8/2003 | Choi et al. |
| 2003/0153320 A1 | 8/2003 | Noerpel et al. |
| 2003/0153360 A1 | 8/2003 | Burke et al. |
| 2003/0157953 A1 | 8/2003 | Das et al. |
| 2003/0157954 A1 | 8/2003 | Medvedev et al. |
| 2003/0161282 A1 | 8/2003 | Medvedev et al. |
| 2003/0162519 A1 | 8/2003 | Smith et al. |
| 2003/0165189 A1 | 9/2003 | Kadous et al. |
| 2003/0185309 A1 | 10/2003 | Pautler et al. |
| 2003/0185311 A1 | 10/2003 | Kim |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235147 A1 | 12/2003 | Walton et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0037257 A1 | 2/2004 | Ngo |
| 2004/0042439 A1 | 3/2004 | Menon et al. |
| 2004/0042556 A1 | 3/2004 | Medvedev et al. |
| 2004/0047292 A1 | 3/2004 | Du Crest |
| 2004/0052228 A1 | 3/2004 | Tellado et al. |
| 2004/0071104 A1 | 4/2004 | Boesel et al. |
| 2004/0071107 A1 | 4/2004 | Kats et al. |

| | | | | | |
|---|---|---|---|---|---|
| 2004/0076224 A1 | 4/2004 | Onggosanusi et al. | EP | 1143754 | 10/2001 |
| 2004/0082356 A1 | 4/2004 | Walton et al. | EP | 1170879 | 1/2002 |
| 2004/0085939 A1 | 5/2004 | Wallace et al. | EP | 1175022 A2 | 1/2002 |
| 2004/0120411 A1 | 6/2004 | Walton et al. | EP | 1182799 A2 | 2/2002 |
| 2004/0136349 A1 | 7/2004 | Walton et al. | EP | 1185001 A2 | 3/2002 |
| 2004/0151108 A1 | 8/2004 | Blasco Claret et al. | EP | 1185015 | 3/2002 |
| 2004/0151122 A1 | 8/2004 | Lau et al. | EP | 1185048 A2 | 3/2002 |
| 2004/0156328 A1 | 8/2004 | Walton | EP | 1207635 | 5/2002 |
| 2004/0160987 A1 | 8/2004 | Sudo et al. | EP | 1207645 A1 | 5/2002 |
| 2004/0176097 A1 | 9/2004 | Wilson et al. | EP | 1223702 A1 | 7/2002 |
| 2004/0179627 A1 | 9/2004 | Ketchum et al. | EP | 1241824 A1 | 9/2002 |
| 2004/0184398 A1 | 9/2004 | Walton et al. | EP | 1265411 | 12/2002 |
| 2004/0198276 A1 | 10/2004 | Tellado et al. | EP | 1315311 A1 | 5/2003 |
| 2004/0252632 A1 | 12/2004 | Bourdoux et al. | EP | 1379020 | 1/2004 |
| 2005/0047384 A1 | 3/2005 | Wax et al. | EP | 1387545 | 2/2004 |
| 2005/0047515 A1 | 3/2005 | Walton et al. | EP | 1416688 A1 | 5/2004 |
| 2005/0099974 A1 | 5/2005 | Kats et al. | EP | 1447934 A1 | 8/2004 |
| 2005/0111599 A1 | 5/2005 | Walton et al. | EP | 1556984 A2 | 7/2005 |
| 2005/0120097 A1 | 6/2005 | Walton et al. | EP | 0895387 | 9/2008 |
| 2005/0128953 A1 | 6/2005 | Wallace et al. | GB | 2300337 | 10/1996 |
| 2005/0135284 A1 | 6/2005 | Nanda et al. | GB | 2373973 A | 10/2002 |
| 2005/0135295 A1 | 6/2005 | Walton et al. | JP | 03104430 | 5/1991 |
| 2005/0135318 A1 | 6/2005 | Walton et al. | JP | 06003956 | 1/1994 |
| 2005/0147177 A1 | 7/2005 | Seo et al. | JP | 06501139 | 1/1994 |
| 2005/0185575 A1 | 8/2005 | Hansen et al. | JP | 08274756 | 10/1996 |
| 2005/0208959 A1 | 9/2005 | Chen et al. | JP | 09135230 | 5/1997 |
| 2005/0220211 A1 | 10/2005 | Shim et al. | JP | 9266466 | 10/1997 |
| 2005/0276343 A1 | 12/2005 | Jones | JP | 9307526 | 11/1997 |
| 2006/0018395 A1 | 1/2006 | Tzannes | JP | 09327073 | 12/1997 |
| 2006/0067417 A1 | 3/2006 | Park et al. | JP | 9512156 | 12/1997 |
| 2006/0072649 A1 | 4/2006 | Chang et al. | JP | 10028077 | 1/1998 |
| 2006/0077935 A1 | 4/2006 | Hamalainen et al. | JP | 10084324 | 3/1998 |
| 2006/0104196 A1 | 5/2006 | Wu et al. | JP | 10209956 | 8/1998 |
| 2006/0153237 A1 | 7/2006 | Hwang et al. | JP | 10303794 A | 11/1998 |
| 2006/0159120 A1 | 7/2006 | Kim | JP | 10327126 | 12/1998 |
| 2006/0183497 A1 | 8/2006 | Paranchych et al. | JP | 1132027 | 2/1999 |
| 2006/0209894 A1 | 9/2006 | Tzannes et al. | JP | 1141159 | 2/1999 |
| 2006/0209937 A1 | 9/2006 | Tanaka et al. | JP | 2991167 | 3/1999 |
| 2007/0069536 A1 | 4/2007 | Ketchum et al. | JP | 11069431 A | 3/1999 |
| 2007/0177681 A1 | 8/2007 | Choi et al. | JP | 11074863 | 3/1999 |
| 2007/0274278 A1 | 11/2007 | Choi et al. | JP | 11163823 A | 6/1999 |
| 2008/0069015 A1 | 3/2008 | Walton et al. | JP | 11 205273 A | 7/1999 |
| 2008/0267098 A1 | 10/2008 | Walton et al. | JP | 11205273 | 7/1999 |
| 2008/0267138 A1 | 10/2008 | Walton et al. | JP | 11252037 A | 9/1999 |
| 2008/0285488 A1 | 11/2008 | Walton et al. | JP | 2000078105 | 3/2000 |
| 2008/0285669 A1 | 11/2008 | Walton et al. | JP | 2000092009 A | 3/2000 |
| 2008/0285670 A1 | 11/2008 | Walton et al. | JP | 2001044930 A | 2/2001 |
| 2010/0067401 A1 | 3/2010 | Medvedev et al. | JP | 200186045 | 3/2001 |
| 2010/0119001 A1 | 5/2010 | Walton et al. | JP | 2001186051 | 7/2001 |
| 2010/0142636 A1 | 6/2010 | Heath, Jr. et al. | JP | 2001217896 | 8/2001 |
| 2010/0183088 A1 | 7/2010 | Inanoglu | JP | 2001231074 | 8/2001 |
| 2010/0260060 A1 | 10/2010 | Abraham et al. | JP | 2001237751 | 8/2001 |

FOREIGN PATENT DOCUMENTS

| | | |
|---|---|---|
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504372 | 2/2006 |
| KR | 200011799 | 2/2000 |
| KR | 20010098861 | 11/2001 |
| KR | 1020020003370 | 1/2002 |
| KR | 20030085040 | 11/2003 |
| KR | 2006-0095576 | 8/2006 |
| RU | 2015281 C1 | 6/1994 |
| RU | 2139633 | 10/1999 |
| RU | 2141168 | 11/1999 |
| RU | 214509 | 5/2000 |
| RU | 2152132 | 6/2000 |
| CA | 2690247 A1 | 10/2001 |
| CN | 1086061 | 4/1994 |
| CN | 1234661 | 11/1999 |
| CN | 1308794 | 8/2001 |
| CN | 1469662 | 1/2004 |
| CN | 1489836 A | 4/2004 |
| CN | 1537371 | 10/2004 |
| DE | 19951525 A1 | 6/2001 |
| EP | 0755090 | 1/1997 |
| EP | 0762701 | 3/1997 |
| EP | 0 772 329 A | 5/1997 |
| EP | 0772329 | 5/1997 |
| EP | 0805568 A1 | 11/1997 |
| EP | 0 895 387 A | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 A2 | 9/2001 |
| EP | 1137217 | 9/2001 |

| | | |
|---|---|---|
| RU | 2157592 | 10/2000 |
| RU | 2158479 C2 | 10/2000 |
| RU | 2168278 | 5/2001 |
| RU | 2197781 C2 | 1/2003 |
| RU | 2201034 | 3/2003 |
| RU | 2335852 | 1/2006 |
| TW | 419912 | 1/2001 |
| TW | 545006 B | 8/2003 |
| TW | 583842 B | 4/2004 |
| TW | I230525 | 4/2005 |
| WO | WO8607223 | 12/1986 |
| WO | WO9307684 A1 | 4/1993 |
| WO | WO9507578 | 3/1995 |
| WO | 9530316 | 11/1995 |
| WO | 9532567 | 11/1995 |
| WO | WO9622662 | 7/1996 |
| WO | WO9635268 | 11/1996 |
| WO | 9719525 | 5/1997 |
| WO | WO9736377 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 A1 | 7/1998 |
| WO | WO9857472 | 12/1998 |
| WO | WO9903224 A1 | 1/1999 |
| WO | WO9914878 | 3/1999 |
| WO | WO9916214 | 4/1999 |
| WO | 9944379 | 9/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | 0105067 | 1/2001 |
| WO | WO0126269 | 4/2001 |
| WO | WO016801 A2 | 9/2001 |
| WO | WO0171928 | 9/2001 |
| WO | 0176110 | 10/2001 |
| WO | WO0180510 | 10/2001 |
| WO | WO0182521 A2 | 11/2001 |
| WO | WO0197400 | 12/2001 |
| WO | WO0201732 A2 | 1/2002 |
| WO | WO0203557 A1 | 1/2002 |
| WO | WO0215433 A1 | 2/2002 |
| WO | 0225853 | 3/2002 |
| WO | WO02060138 | 8/2002 |
| WO | WO02062002 A1 | 8/2002 |
| WO | WO02065664 | 8/2002 |
| WO | 02069590 | 9/2002 |
| WO | WO02069523 A1 | 9/2002 |
| WO | WO02073869 A1 | 9/2002 |
| WO | 02078211 | 10/2002 |
| WO | WO02082689 A2 | 10/2002 |
| WO | WO02093784 A1 | 11/2002 |
| WO | WO02099992 | 12/2002 |
| WO | 03010984 | 2/2003 |
| WO | WO03010994 A1 | 2/2003 |
| WO | 03019984 | 3/2003 |
| WO | WO03028153 | 4/2003 |
| WO | WO03034646 A2 | 4/2003 |
| WO | WO03047140 A1 | 6/2003 |
| WO | WO03075479 | 9/2003 |
| WO | WO2004002011 | 12/2003 |
| WO | WO2004002047 | 12/2003 |
| WO | 2004039011 | 5/2004 |
| WO | WO2004038985 A2 | 5/2004 |
| WO | WO2004038986 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31 (2002).
ETSI TS 101 761-1 v1.3.1, "Broadband Radio Access Networks (BRAN); Hiperlan Type 2; Data Link Control (DLC) Layer; Part 1: Basic Data Transport Functions," ETSI Standards, European Telecommunications Standards Institute BR (V131), pp. 1-88 (Dec. 2001).
Fujii, M.: "Pseudo-Orthogonal Multibeam-Time Transmit Diversity for OFDM-CDMA" pp. 222-226 (2002).
Haustein, T. et al.: "Performance of MIMO Systems with Channel Inversion," IEEE 55th Vehicular Technology Conference, Birmingham, Alabama, May 6-9 (2002), pp. 35-39.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11 (2001), pp. 1508-1512.
Tarighat, A. et al., "Performance Analysis of Different Algorithms for cdma2000 Antenna Array System and a New Multi User Beamforming (MUB) Algorithm", Wireless Communications and Networking Conference, pp. 409-414 Sep. 2000.
Thoen, S. et al.: "Improved Adaptive Downlink for OFDM/SDMA-Based Wireless Networks," IEEE VTS 53rd Vehicular Technology Conference, pp. 707-711, Rhodes, Greece, (May 6-9, 2001).
Tujkovic, D.: "High bandwidth efficiency space-time turbo coded modulation", Institute of Electrical and Electronics Engineers, ICC 2001.2001 IEEE International Conference on Communications, Conference Record, pp. 1104-1109, Helsinky, Finland, (Jun. 11-14, 2001).
Van Zelst, A. et al.: "Space Division Multiplexing (SDM) for OFDM Systems," IEEE 51st Vehicular Technology Conference Proceedings, pp. 1070-1074, Tokyo, Japan, (May 15-18, 2000).
Werner and Leung: "OFDM/FM frame synchronization for mobile radio data communication", IEEE Transactions on Vehicular Technology, vol. 42, No. 3, p. 302-313.
International Preliminary Exam Report—PCT/US03/034568, International Search Authority—European Patent Office—Nov. 24, 2006.
International Search Report—PCT/US03/034568, International Search Authority—European Patent Office—Jun, 4, 2004.
Li Lihua, et al., "A Practical Space-Frequency Block Coded OFDM Scheme for Fast Fading Broadband Channels" 13th IEEE International Symposium on Personal Indoor and Mobile Radio Communications. PIMRC 2002. Sep. 15-18, 2002, pp. 212-216, vol. 1, XP002280831.
M.A. Kousa, et al., "Multichannel adaptive system," IEE Proceedings-I, vol. 140, No. 5, Oct. 1993, rages 357-364.
Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
Warner and Leung: "OFDM/FM frame synchronization for mobile radio data communication", IEEE Transactions on Vehicular Technology, vol. 42 , No. 3, p. 302-313.
International Preliminary Exam Report—PCT/US03/034568, International Search Authority—European Patent Office—Nov. 24, 2006.
International Search Report—PCT/US03/034568, International Search Authority—European Patent Office—Jun. 4, 2004.
3GPP2 TIA/EIA/IS-2000.2-A, "Physical Layer Standard for cdma2000: Standards for Spread Spectrum Systems," (Mar. 2000), Telecommunications Industry Association, pp. 1-446.

Bingham, John A.C.: "Multicarrier Modulation for Data Transmission: an Idea Whose Time Has Come," IEEE Communications Magazine, pp. 5-14 (May 1990).
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001, pp. 1-5.
Deniere, Luc, et al.:"A Low Complexity ML Channel Estimator for OFDM," Proc IEEE ICC (Jun. 2001), pp. 1461-1465.
Diggavi, S. et al., "Intercarrier interference in MIMO OFDM," IEEE International Conference on Communications, (Aug. 2002), vol. 1, pp. 485-489, doi:10.1109/ICC.2002.996901.
Gao, J, et al, "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore D. A., et al: "Selecting an optimal set of transmit antennas for a low rank matrix channel," 2000 IEEE International Conference on Acoustics, Speech, and Signal Processing, Proceedings, (ICASSP). Istanbul, Turkey, Jun. 5-9, 2000, New York, NY; IEEE, US, vol. 5 of 6, Jun. 5, 2000, pp. 2785-2788, XP001035763, abstract.
Hassibi, B. et al., "High Rate Codes That Are Linear In Space And Time," Lucent Technologies, 2002, pp. 1-55.
Hayashi, K. et al.: "A New Spatio-Temporal Equalization Method Based On Estimated Channel Response," Sep. 2001, IEEE Transactions on Vehicular Technology, vol. 50, No. 5, pp. 1250-1259.
Iserte, P., et al., "Joint beamforming strategies in OFDM-MIMO systems," Acoustics, Speech, and Signal Processing, 1993. ICASSP-93., 1993 IEEE International Conference on, vol. 3, sections 2-3, Apr. 27-30, 1993, doi: 10.1109/ICASSP.2002.1005279.
Jongren, G. et al.: "Utilizing Quantized Feedback Information In Orthogonal Space-Time Block Coding," 2000 IEEE Global Telecommunications Conference, 2(4): 995-999, Nov. 27, 2000.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp, 593-597.
Lebrun G., at al,, "MIMO transmission over a time varying TDD channel using SVD," Electronics Letters, 2001, vol. 37, pp. 1363-1364.
Li, Ye et al., "Simplified Channel Estimation for OFDM Systems with Multiple Transmit Antennas," IEEE Transactions on Wireless Communications, Jan. 2002, vol. 1, No. 1, pp. 67-75.
Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. 1 of 4. Conf. 56, (Sep. 24, 2002), pp. 1302-1306, XP010608639.
Office Action in Canadian application 2501634 corresponding to U.S. Appl. No. 10/610,446, citing CA2690247 dated Feb. 25, 2011.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.
The Authoritative Dictionary of IEEE Standards Terms, Seventh Edition, IEEE Press: New York (Dec. 2000), p. 902.
Translation of Office Action in Japanese application 2005-501686 corresponding to U.S. Appl. No. 10/375,162, citing JP09135230 dated Feb. 15, 2011.
U.S. Appl. No. 60/421,309.
U.S. Appl. No. 60/421,428.
Wales, S.W. "A mimo technique within the UTRA TDD standard," MIMO: Communications Systems from Concept to Implementations (Ref. No. 2001/175), IEE Seminar on, (Dec. 12, 2001), pp. 1-8, London, UK.
Wolniansky, P.W.; Foschini, G.J.; Golden, G.D.; Valenzuela, R.A.;, "V-BLAST: an architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.
Wong, Cheong. et al., "Multiuser OFDM with Adaptive Subcarrier, Bit and Power Allocation," Oct. 1999, IEEE Journal on Selected Areas in Communications, vol. 17, No. 10, pp. 1747-1758.
Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Office Action dated Aug. 13, 2008 for Australian Application Serial No. 2004223374, 2 pages.
Office Action dated Jun. 27, 2008 for Chinese Application Serial No. 200480011307.6, 3 pages.
Singapore Search Report—SG20104266-1—Hungary Intellectual Patent Office—Sep. 8, 2011 (050452SGD2).
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, col. 2, paragraph 4 through p. 36, col. 1.
Wyglinski, Alexander. "Physical Layer Loading Algorithms for Indoor Wireless Multicarrier Systems," Thesis Paper, McGill University, Montreal, Canada, Nov. 2004, p. 109.

* cited by examiner

DATA DETECTION AND DEMODULATION FOR WIRELESS COMMUNICATION SYSTEMS

CLAIM OF PRIORITY UNDER 35 U.S.C. §119

This application claims the benefit of U.S. Provisional Application Ser. No. 60/421,309, entitled "MIMO WLAN System," filed on Oct. 25, 2002, assigned to the assignee of the present application, and incorporated herein by reference in its entirety for all purposes.

This application claims the benefit of U.S. Provisional Application Ser. No. 60/432,626, entitled "Data Detection and Demodulation for Wireless Communication Systems," filed on Dec. 10, 2002, assigned to the assignee of the present application, and incorporated herein by reference in its entirety for all purposes.

RELATED APPLICATIONS

This application is further related to U.S. Patent Application Ser. No. 60/432,440, entitled "Random Access For Wireless Multiple-Access Communication Systems," filed on Dec. 10, 2002, assigned to the assignee of the present application, and incorporated herein by reference in its entirety for all purposes.

BACKGROUND

I. Field

The present invention relates generally to data communication, and more specifically to techniques for detecting and demodulating data transmissions in wireless communication systems.

II. Background

In a wireless communication system, data to be transmitted is typically processed (e.g., coded and modulated) and then upconverted onto a radio frequency (RF) carrier signal to generate an RF modulated signal that is more suitable for transmission over a wireless channel. The RF modulated signal is then transmitted from a transmitter and may reach a receiver via a number of propagation paths in the wireless channel. The characteristics of the propagation paths typically vary over time due to a number of factors such as, for example, fading, multipath, and external interference. Consequently, the RF modulated signal may experience different channel conditions (e.g., different fading and multipath effects) and may be associated with different complex gains across the operating bandwidth of the system.

To achieve high performance, a pilot (i.e., a reference signal) is often transmitted by the transmitter to assist the receiver in performing a number of functions. The pilot is typically generated based on known symbols and processed in a known manner. The pilot may be used by the receiver for channel estimation, timing and frequency acquisition, coherent demodulation, and so on It is often desirable or necessary to detect for the presence of data transmissions in a received signal. The detection for data transmissions is normally achieved by processing the pilot for each data transmission hypothesized to have been received. If the energy of the pilot is greater than a particular threshold, then the hypothesized data transmission is further processed (e.g., demodulated and decoded). An error detection code, such as a cyclic redundancy check (CRC), is then typically relied upon to determine whether the data transmission was decoded correctly or in error.

In some wireless communication systems, detection based on the pilot alone is not sufficient. This may be the case, for example, when operating at a low received signal-to-noise ratio (SNR). Moreover, an error detection code may not be available for use to verify the correctness of the received data transmission.

There is therefore a need in the art for techniques to detect and demodulate data transmissions in such wireless communication systems.

SUMMARY

Techniques are provided herein for detecting and demodulating data transmissions in wireless communication systems. In one aspect, a decision-directed detector is provided to detect for data transmissions in a received signal. This detector utilizes received data symbols as well as received pilot symbols to perform the detection and is thus able to provide improved detection performance. The decision-directed detector may be designed to operate in the frequency domain or the time domain. For a system utilizing multi-carrier modulation (e.g., OFDM), the detector may be designed to perform differential detection in the frequency domain or coherent detection in the time domain, both of which are described in detail below.

In another aspect, an adaptive threshold is used to perform detection of received data transmissions. A threshold may be determined for each data transmission hypothesized to have been received. The threshold may be computed, for example, based on the total received signal energy (i.e., signal plus noise plus interference) of the hypothesized data transmission. The use of an adaptive threshold can provide robust detection performance in many operating environments, such as in an unlicensed frequency band where various sources of interference may be present.

Various aspects and embodiments of the invention are described in further detail below. For example, receiver structures for various transmission schemes are also described herein.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
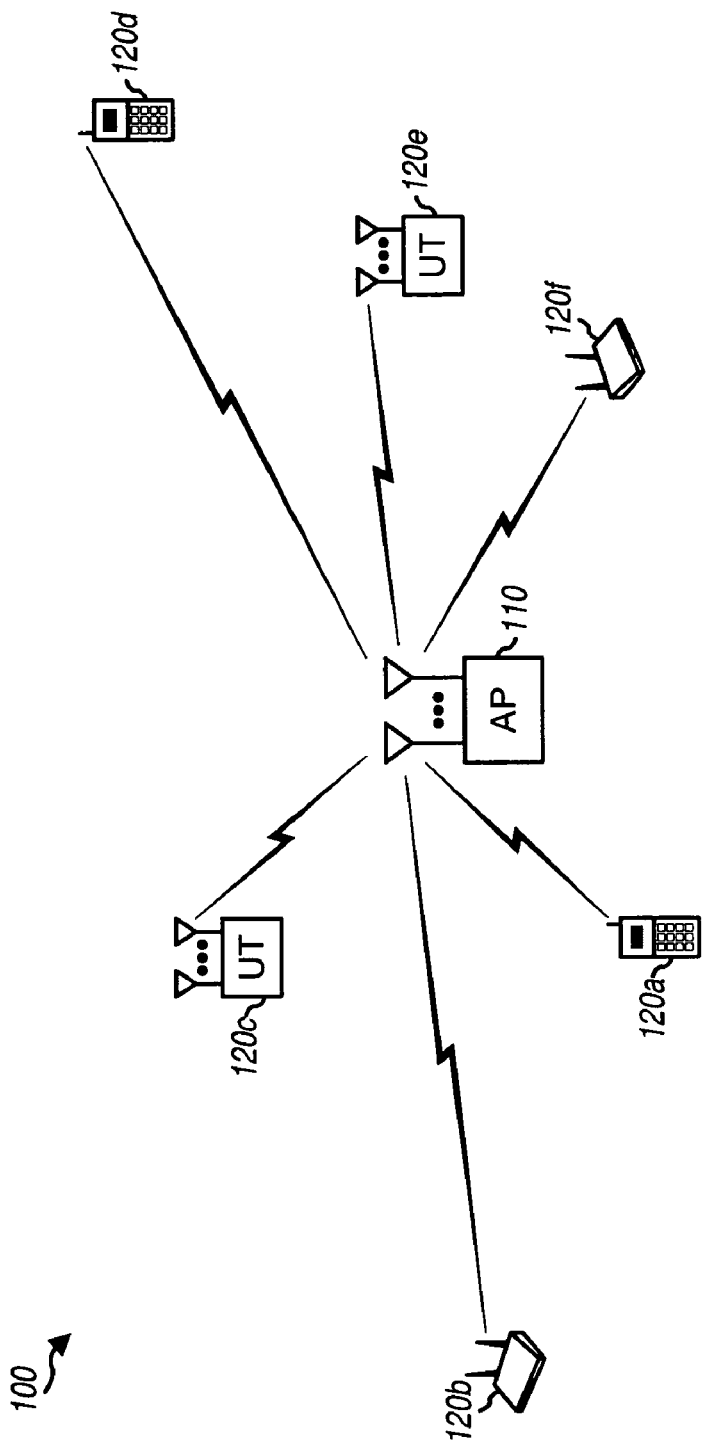
FIG. 1 shows a wireless communication system.

FIG. 1 shows a wireless communication system 100 that includes a number of access points (APs) 110 that communicate with a number of user terminals (UTs) 120. (For simplicity, only one access point is shown in FIG. 1.) An access point may also be referred to as a base station or some other terminology. Each user terminal may be a fixed or mobile terminal and may also be referred to as an access terminal, a mobile station, a remote station, a user equipment (UE), a wireless device, or some other terminology. Each user terminal may communicate with one or possibly multiple access points on the downlink and/or the uplink at any given moment. The downlink (i.e., forward link) refers to transmission from the access point to the user terminal, and the uplink (i.e., reverse link) refers to transmission from the user terminal to the access point.

The techniques described herein for detecting and demodulating data transmission may be used for various wireless communication systems. For example, these techniques may be used for systems that employ (1) one or multiple antennas for data transmission and one or multiple antennas for data reception, (2) various modulation techniques (e.g., CDMA, OFDM, and so on), and (3) one or multiple frequency bands for the downlink and uplink.

For clarity, the techniques are specifically described below for an exemplary wireless communication system. In this system, a receiver is equipped with multiple (T) antennas for data reception, and a transmitter may be equipped with one or multiple antennas. The system further employs orthogonal frequency division multiplexing (OFDM), which effectively partitions the overall system bandwidth into multiple (N) orthogonal subbands. For OFDM, the data or pilot to be transmitted on each subband is first modulated (i.e., symbol mapped) using a particular modulation scheme. Signal values of zero are provided for subbands not used for data/pilot transmission. For each OFDM symbol period, the modulation symbols and zero signal values for all N subbands are transformed to the time domain using an inverse fast Fourier transform (IFFT) to obtain a transformed symbol that comprises N time-domain samples. To combat inter-symbol interference (ISI), a portion of each transformed symbol is often repeated to form a corresponding OFDM symbol, which is then transmitted over the wireless channel. An OFDM symbol period (or simply, a symbol period) corresponds to the duration of one OFDM symbol, which is the smallest unit of transmission for the system. In one specific design, the system bandwidth is 20 MHz, N=64, the subbands are assigned indices of −32 to +31, the duration of each transformed symbol is 3.2 μsec, the cyclic prefix is 800 nsec, and the duration of each OFDM symbol is 4.0 μsec.

For clarity, two specific transmission schemes and two receiver structures are described below. The first transmission scheme is used for Transport Channel 1 (or simply, Channel 1 or CH1) and has the following characteristics: (1) transmissions on Channel 1 are not time-compensated at the transmitter and arrive at unknown times at the receiver, and (2) each transmission on Channel 1 includes multiple OFDM symbols for data and pilot. The second transmission scheme is used for Transport Channel 2 (or simply, Channel 2 or CH2) and has the following characteristics: (1) transmissions on Channel 2 are time-compensated at the transmitter and arrive time-aligned to slot boundaries at the receiver, and (2) each transmission on Channel 2 includes a single OFDM symbol for both data and pilot. Slow and fast random access channels with similar characteristics as those of Channels 1 and 2 are described in the aforementioned U.S. Patent Application Ser. No. 60/432,440.

Figure 2A:
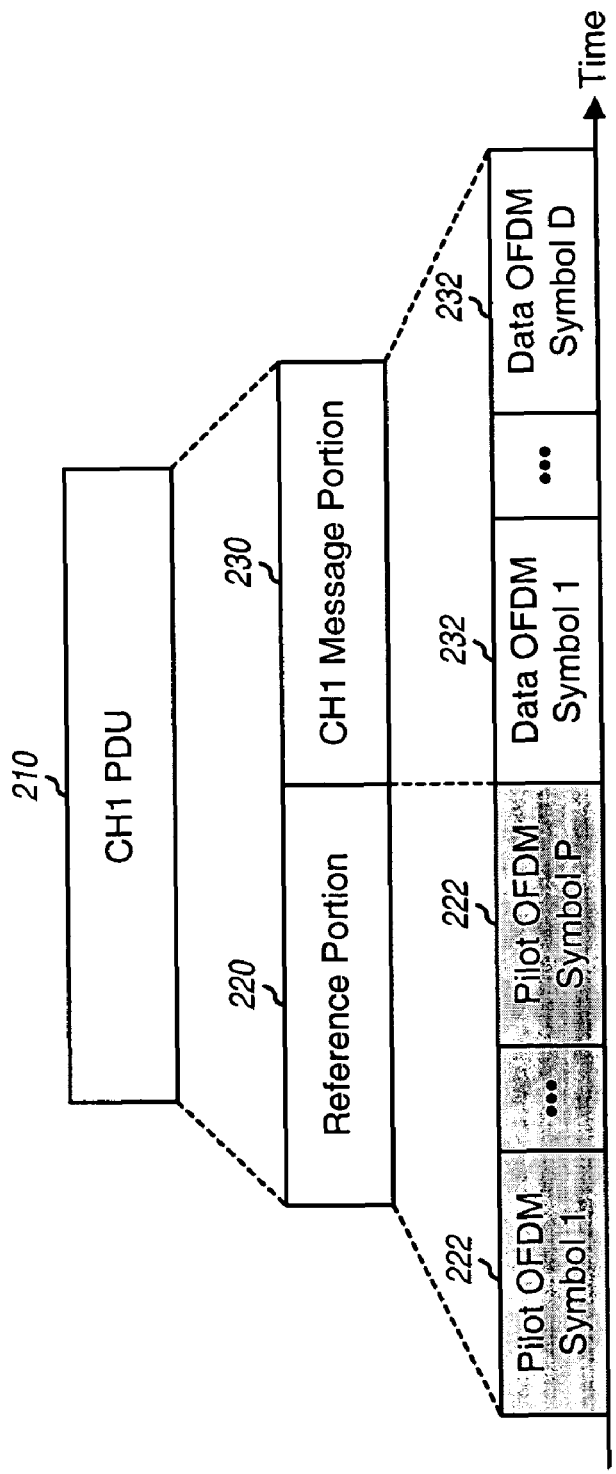
FIGS. 2A and 2B show exemplary protocol data units (PDUs) for Channels 1 and 2, respectively.

FIG. 2A shows an exemplary protocol data unit (PDU) 210 that may be used for Channel 1 (CH1 PDU). CH1 PDU 210 comprises a reference portion 220 that is time division multiplexed (TDM) with a CH1 message portion 230. Reference portion 220 includes P pilot OFDM symbols 222, where P can be any integer one or greater. The pilot OFDM symbols are used to facilitate acquisition and detection of a CH1 transmission as well as to aid in coherent demodulation of the CH1 message portion. CH1 message portion 230 includes D data OFDM symbols 232, where D can be any integer one or greater. The pilot and data OFDM symbols may be generated as described below.

Figure 2B:
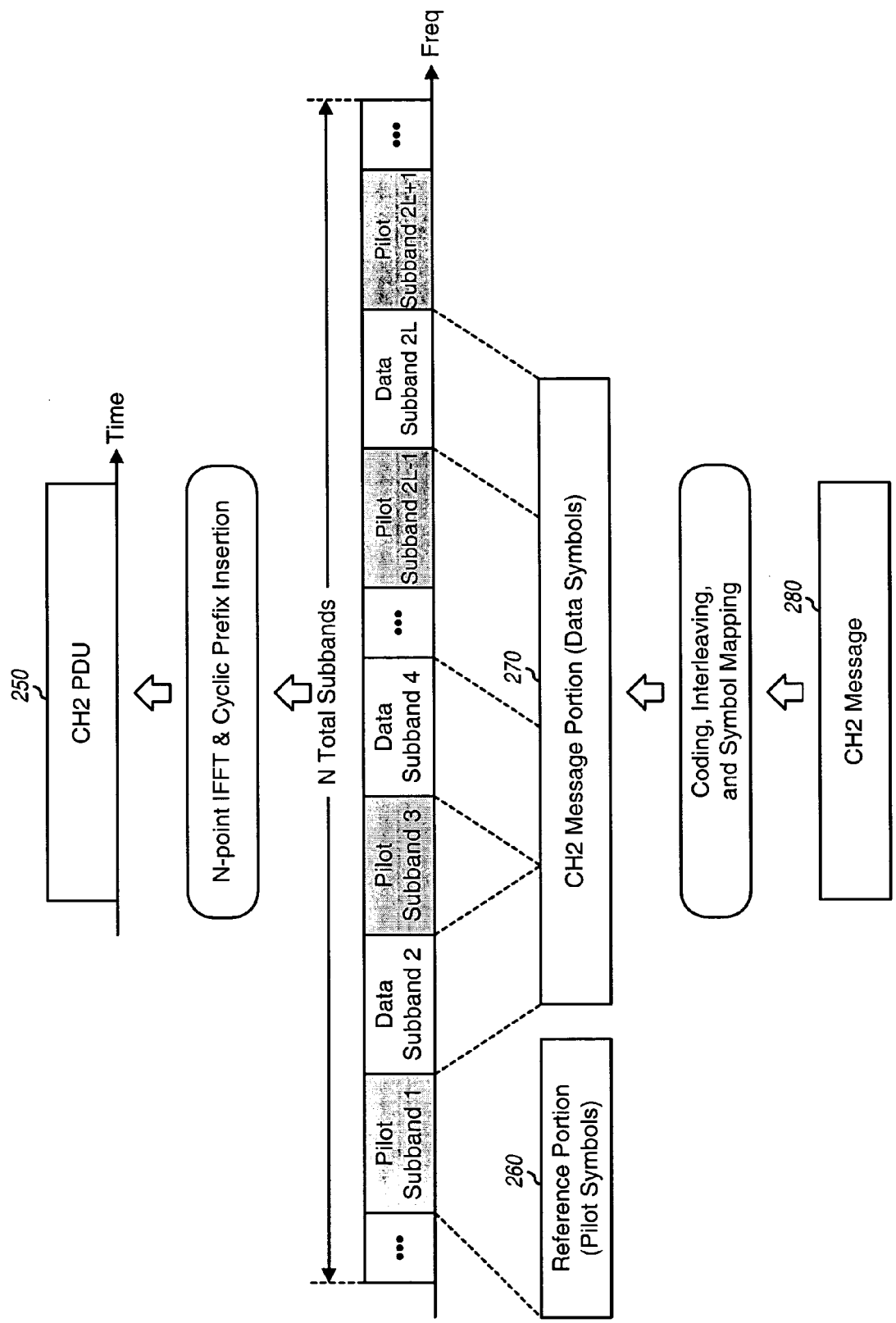

FIG. 2B shows an exemplary PDU 250 that may be used for Channel 2 (CH2 PDU). CH2 PDU 250 comprises a reference portion 260 that is subband multiplexed with a CH2 message portion 270. Reference portion 260 comprises a set of pilot symbols that is transmitted on one set of subbands (shown as shaded subbands in FIG. 2B). CH2 message portion 270 comprises a group of data symbols that is transmitted on another set of subbands. The data symbols are generated by coding, interleaving, and symbol mapping a CH2 message 280. The frequency-domain multiplexed pilot and data symbols are processed to generate time-domain CH2 PDU 250, as described below.

In the embodiment shown in FIG. 2B, the pilot subbands and data subbands are interlaced such that each data subband is flanked on both sides by pilot subbands. The pilot symbols transmitted on the pilot subbands may be used to estimate the channel responses for the data subbands and for coherent demodulation. Other subband multiplexing schemes may also be implemented, and this is within the scope of the invention. For example, each group of Q data subbands may be flanked on both sides by pilot subbands, where Q may be any positive integer.

Figure 3A:
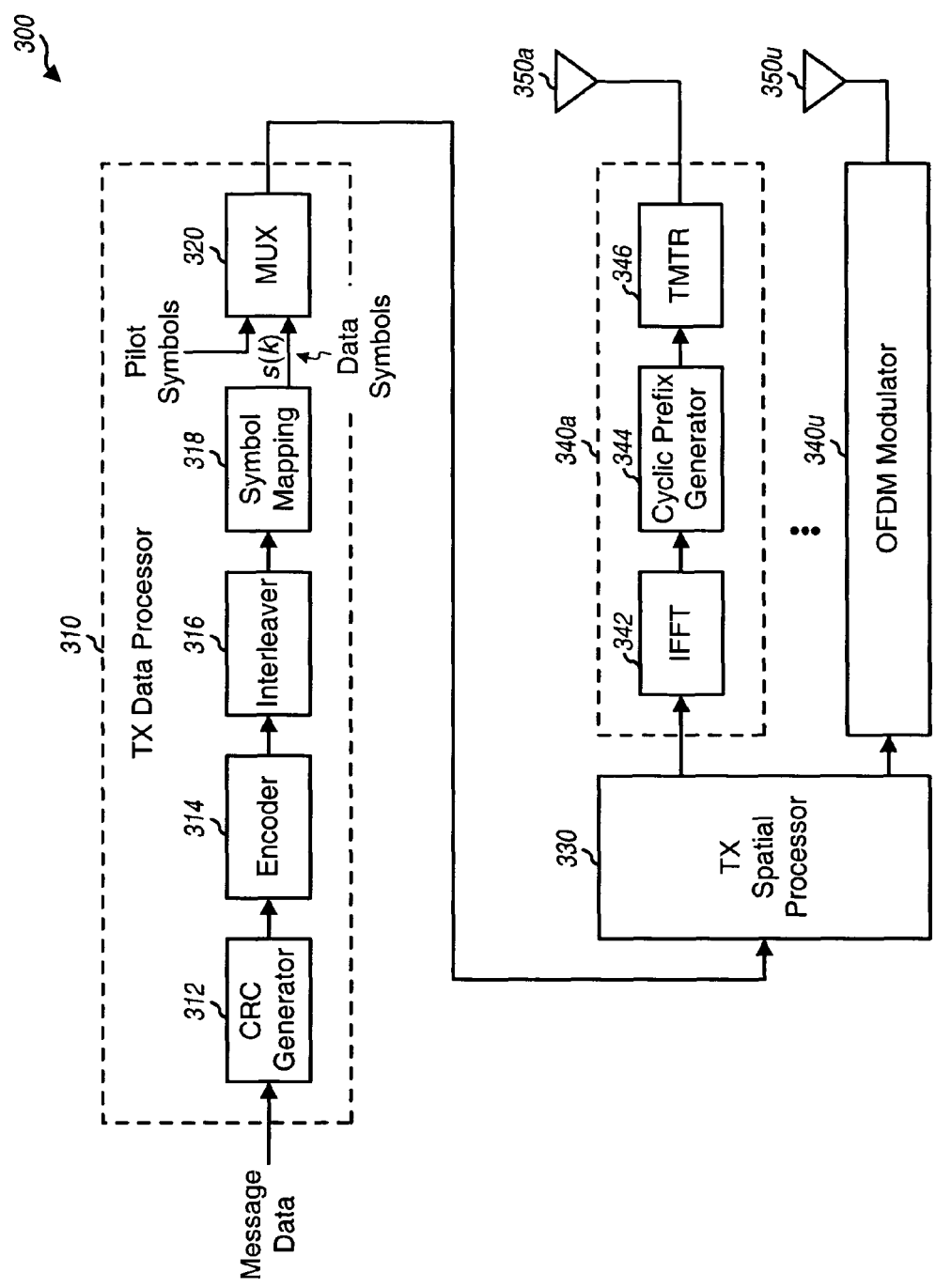
FIG. 3A shows a block diagram of a transmitter unit.

FIG. 3A shows a block diagram of an embodiment of a transmitter unit 300 that can perform transmit data processing for Channels 1 and 2 described above. Transmitter unit 300, which may be implemented within an access point or a user terminal, includes a transmit (TX) data processor 310, an optional TX spatial processor 330, and one OFDM modulator 340 for each transmit antenna 350.

Within TX data processor 310, a CRC generator 312 receives data for a CH1 or CH2 message and (optionally) generates a CRC value for the message. An encoder 314 then codes the message data and the CRC value (if included) in accordance with a particular coding scheme to provide code bits. An interleaver 316 next interleaves (i.e., reorders) the code bits based on a particular interleaving scheme to provide frequency and possibly time diversity. A symbol mapping unit 318 then maps the interleaved data in accordance with a particular modulation scheme to provide modulation symbols, which are also referred to as data symbols and denoted as s(k)

A multiplexer (MUX) 320 receives and multiplexes the data symbols with pilot symbols in the manner defined for the CH1 or CH2 message being processed. For the embodiment shown in FIG. 2A, a CH1 PDU comprises P pilot OFDM symbols followed by D data OFDM symbols. For a CH1 message, multiplexer 320 provides a set of pilot symbols {p₁(k)} for each of the P pilot OFDM symbols, then the data symbols for each of the D data OFDM symbols. For the embodiment shown in FIG. 2B, a CH2 PDU comprises L+1 pilot symbols interlaced with L data symbols. For a CH2 message, multiplexer 320 provides a set of L+1 pilot symbols {p₂(k)} multiplexed with a group of L data symbols. In any case, multiplexer 320 provides a stream of multiplexed data and pilot symbols.

Table 1 shows a specific embodiment of two sets of pilot symbols, {p₁(k)} and {p₂(k)}, for CH1 and CH2 reference portions. In this embodiment, only 52 of the 64 total subbands are used for data and pilot transmission, and the other 12 subbands (with zero entries in Table 1) are not used. In an embodiment, the pilot symbols are QPSK modulation symbols. The 52 pilot symbols for the CH1 reference portion are selected such that a waveform generated based on these pilot symbols has minimum peak-to-average variation. This characteristic allows the pilot OFDM symbol to be transmitted at a higher power level, which can provide improved performance.

portion of the transformed symbol to form a corresponding OFDM symbol comprised of M samples. Cyclic prefix generator 344 provides a stream of OFDM symbols to a transmitter (TMTR) 346, which converts the OFDM symbol stream into one or more analog signals and further amplifies, filters, and frequency upconverts the analog signal(s) to generate an RF modulated signal that is then transmitted from an associated antenna 350.

Figure 3B:
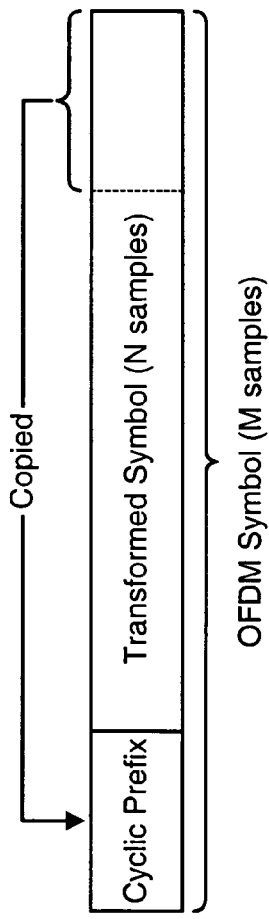
FIG. 3B illustrates an OFDM symbol.

FIG. 3B illustrates an OFDM symbol, which is composed of two parts: a cyclic prefix and a transformed symbol. In an embodiment, N=64, the cyclic prefix comprises 16 samples, and each OFDM symbol comprises M=80 samples. The cyclic prefix is a copy of the last 16 samples (i.e., a cyclic continuation) of the transformed symbol and is inserted in front of the transformed symbol. The cyclic prefix ensures that the OFDM symbol retains its orthogonal property in the presence of multipath delay spread.

Figure 10A:
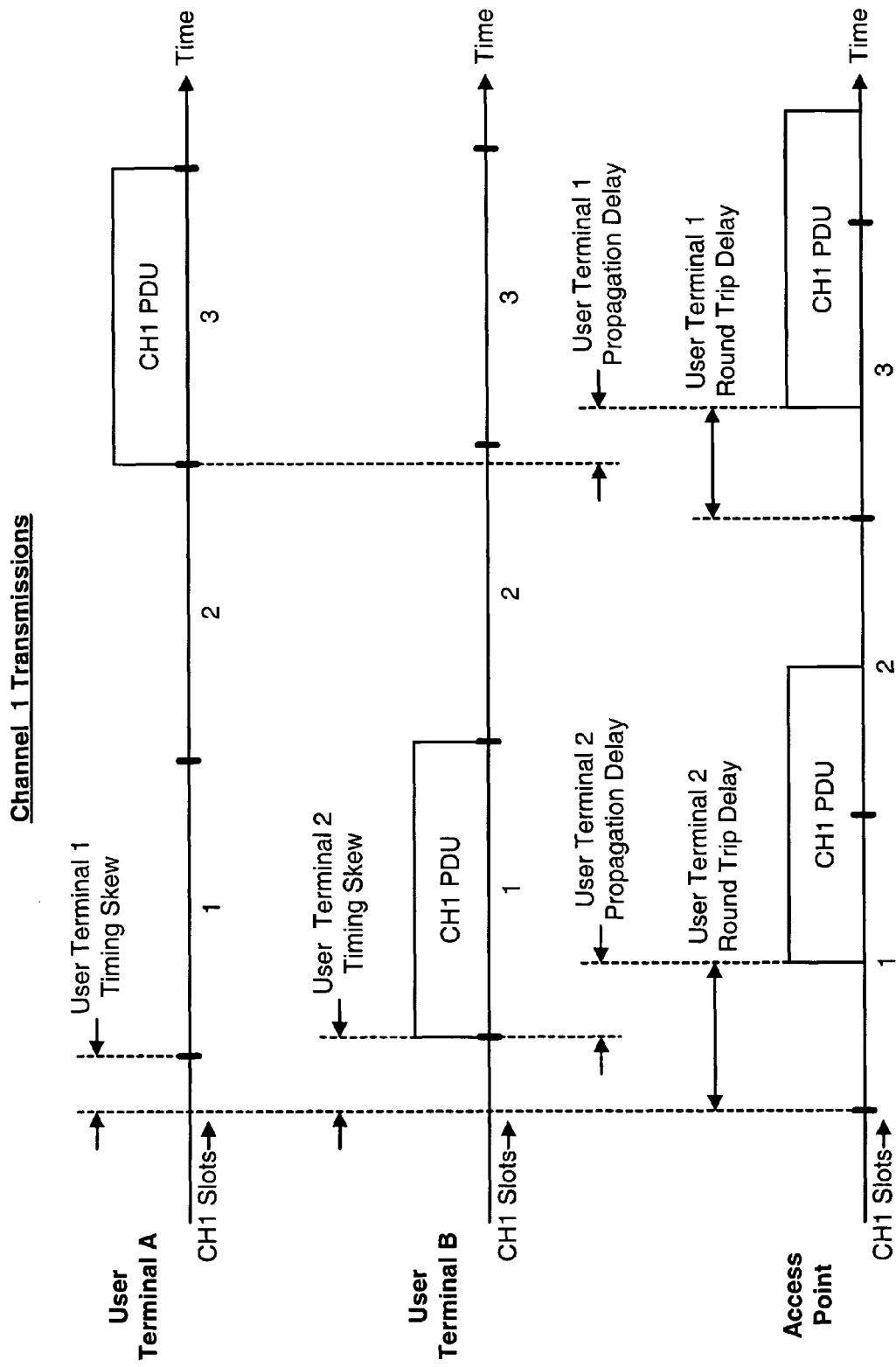
FIGS. 10A and 10B show exemplary transmissions on Channels 1 and 2, respectively.

FIG. 10A shows an exemplary transmission on Channel 1. The time line for Channel 1 is divided into CH1 slots, with each CH1 slot having a particular duration (e.g., P+D OFDM symbol periods). In an embodiment, one CH1 PDU may be transmitted on each CH1 slot.

TABLE 1

Pilot Symbols for CH1 and CH2

| Subband Index | CH1 Pilot Symbol p₁(k) | CH2 Pilot Symbol p₂(k) | Subband Index | CH1 Pilot Symbol p₁(k) | CH2 Pilot Symbol p₂(k) | Subband Index | CH1 Pilot Symbol p₁(k) | CH2 Pilot Symbol p₂(k) | Subband Index | CH1 Pilot Symbol p₁(k) | CH2 Pilot Symbol p₂(k) |
|---|---|---|---|---|---|---|---|---|---|---|---|
| −32 | 0 | 0 | −16 | −1 + j | data | 0 | 0 | 0 | 16 | −1 + j | data |
| −31 | 0 | 0 | −15 | 1 − j | 1 + j | 1 | 1 − j | −1 − j | 17 | −1 + j | 1 − j |
| −30 | 0 | 0 | −14 | 1 + j | data | 2 | −1 − j | data | 18 | 1 − j | data |
| −29 | 0 | 0 | −13 | 1 − j | 1 + j | 3 | −1 − j | −1 − j | 19 | 1 + j | −1 − j |
| −28 | 0 | 0 | −12 | 1 − j | data | 4 | −1 − j | data | 20 | −1 + j | data |
| −27 | 0 | 0 | −11 | −1 − j | 1 + j | 5 | −1 + j | 1 + j | 21 | 1 + j | −1 − j |
| −26 | −1 − j | −1 + j | −10 | −1 − j | data | 6 | 1 + j | data | 22 | −1 + j | data |
| −25 | −1 + j | −1 + j | −9 | 1 − j | 1 − j | 7 | −1 − j | −1 − j | 23 | 1 + j | −1 − j |
| −24 | −1 + j | data | −8 | −1 − j | data | 8 | −1 + j | data | 24 | −1 + j | data |
| −23 | −1 + j | −1 − j | −7 | 1 + j | −1 + j | 9 | −1 − j | 1 − j | 25 | 1 − j | −1 + j |
| −22 | 1 − j | data | −6 | −1 + j | data | 10 | −1 − j | data | 26 | −1 − j | 1 − j |
| −21 | 1 − j | −1 − j | −5 | −1 − j | −1 − j | 11 | 1 + j | 1 + j | 27 | 0 | 0 |
| −20 | 1 + j | data | −4 | −1 + j | data | 12 | 1 − j | data | 28 | 0 | 0 |
| −19 | −1 − j | −1 − j | −3 | −1 + j | −1 + j | 13 | −1 + j | 1 − j | 29 | 0 | 0 |
| −18 | −1 + j | data | −2 | 1 − j | data | 14 | −1 − j | data | 30 | 0 | 0 |
| −17 | 1 + j | 1 + j | −1 | −1 + j | −1 + j | 15 | 1 + j | −1 + j | 31 | 0 | 0 |

If multiple antennas are available, then an optional TX spatial processor 330 may be used to perform spatial processing on the multiplexed data and pilot symbols. For example, TX spatial processor 330 may perform spatial processing for (1) beam-steering or beam-forming to transmit the symbols on a single spatial channel of a MIMO channel, (2) transmit diversity to transmit the symbols on multiple antennas and subbands to achieve diversity, or (3) spatial multiplexing to transmit the symbols on multiple spatial channels. Spatial processing for all of these transmission modes is described in detail in the aforementioned provisional U.S. Application Ser. No. 60/421,309.

TX spatial processor 330 provides one stream of transmit symbols for each antenna. The transmit symbols are simply the multiplexed data and pilot symbols if spatial processing is not performed. Each transmit symbol stream is provided to a respective OFDM modulator 340. Within each OFDM modulator 340, an inverse fast Fourier transform (IFFT) unit 342 converts each sequence of N transmit symbols into a time-domain transformed symbol comprised of N time-domain samples, where N is the total number of subbands. For each transformed symbol, a cyclic prefix generator 344 repeats a User terminals A and B have locked their timing and frequency to that of the system. This may be achieved by receiving a transmission (e.g., a beacon pilot) that carries or is embedded with timing information. The user terminals then set their timing based on the received timing information. However, the timing of each user terminal may be skewed (or delayed) with respect to the system timing, where the amount of skew typically corresponds to the propagation delay for the transmission containing the timing information. If the user terminals and system both derive their timing from a common time source (e.g., GPS), then there may be no timing skews between these entities.

In FIG. 10A, user terminals A and B (e.g., randomly) select two different CH1 slots (e.g., slots 3 and 1, respectively) to transmit their CH1 PDUs. Because user terminals A and B are associated with different timing skews and different propagation delays, their CH1 PDUs arrive at the access point with different delays (referred to as round trip delays or RTDs) with respect to the access point's CH1 slot boundaries.

Figure 10B:
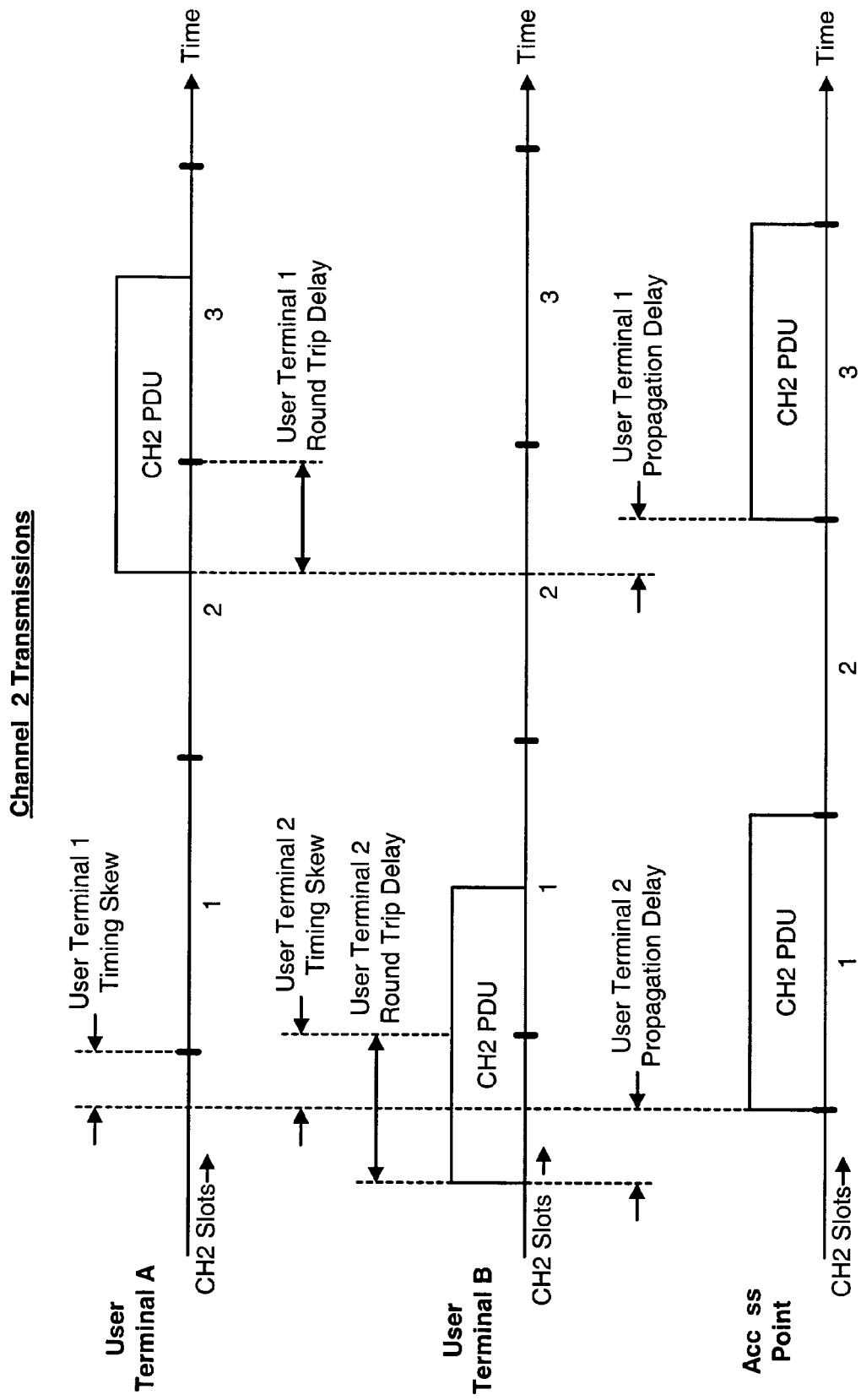

FIG. 10B shows an exemplary transmission on Channel 2. The time line for Channel 2 is divided into CH2 slots, with each CH2 slot having a particular duration (e.g., one OFDM symbol period). One CH2 PDU may be transmitted on each CH2 slot.

For FIG. 10B, user terminals A and B have locked their timing to that of the system and further have knowledge of their RTDs, which may be determined by the access point (e.g., during system access) and reported back to the user terminals. The user terminals may thereafter adjust their transmit timing to account for their RTDs such that their CH2 PDUs arrive time-aligned to the selected CH2 slot boundaries at the access point.

In FIG. 10B, user terminals A and B (e.g., randomly) select CH2 slots 3 and 1, respectively, to transmit their CH2 PDUs. Because user terminals A and B time-compensated their transmissions, the CH2 PDUs arrive at the access point approximately aligned to the boundaries of the selected CH2 slots, as shown in FIG. 10B.

Figure 4:
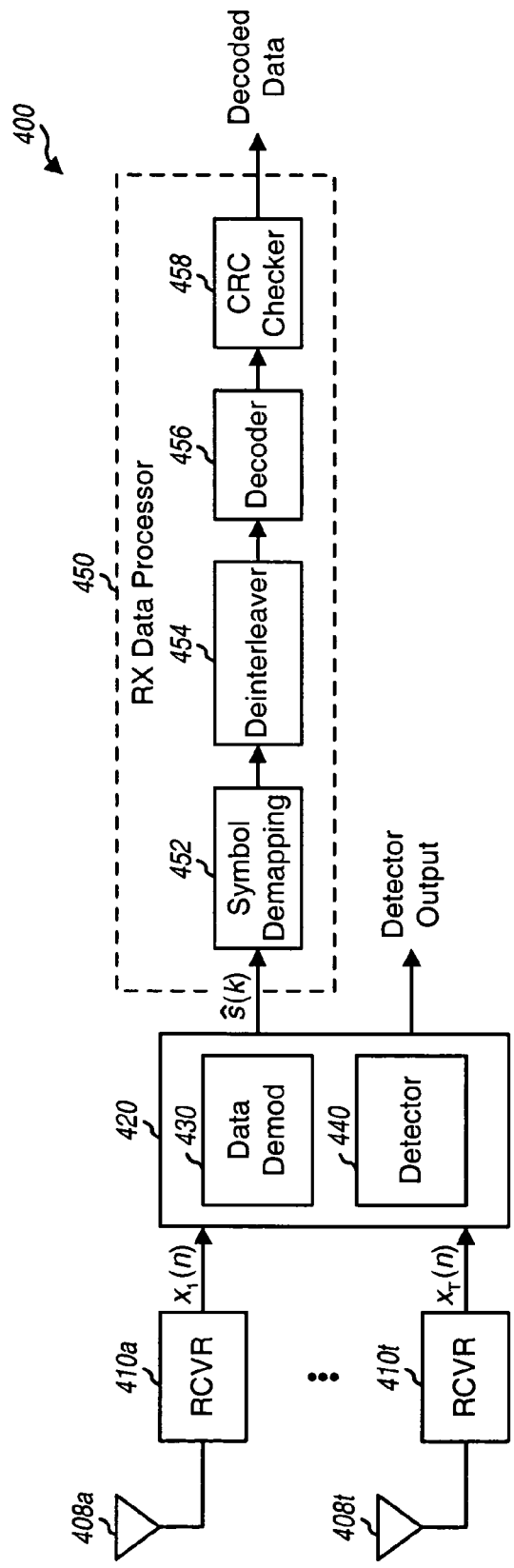
FIG. 4 shows a block diagram of a receiver unit.

FIG. 4 shows a block diagram of an embodiment of a receiver unit 400 that can perform receive data processing for Channels 1 and 2 described above. Receiver unit 400, which may also be implemented within an access point or a user terminal, includes one receiver (RCVR) 410 for each of T receive antennas 408, a detector/data demodulator 420, and a receive (RX) data processor 450.

Each antenna 408 receives the RF modulated signals transmitted by the transmitter unit and provides a received signal to a respective receiver 410. Each receiver 410 conditions (e.g., amplifies, filters, and frequency downconverts) its received signal and digitizes the conditioned signal to provide samples, which are denoted as $x_i(n)$.

Detector/data demodulator 420 includes a data demodulator 430 and a detector 440 that receive and process the samples from all receivers 410 to detect and demodulate data transmissions on Channels 1 and 2. The processing by unit 420 is described in further detail below. Unit 420 provides recovered data symbols, denoted as $\hat{s}(k)$, which are estimates of the transmitted data symbols $s(k)$. Within RX data processor 450, the recovered data symbols are demapped by a symbol demapping unit 452, deinterleaved by a deinterleaver 454, and decoded by a decoder 456 to provide decoded data for CH1 and CH2 messages. If a recovered message includes a CRC value, then a CRC checker 458 checks the message with the CRC value to determine whether it was decoded correctly or in error.

Figure 11A:
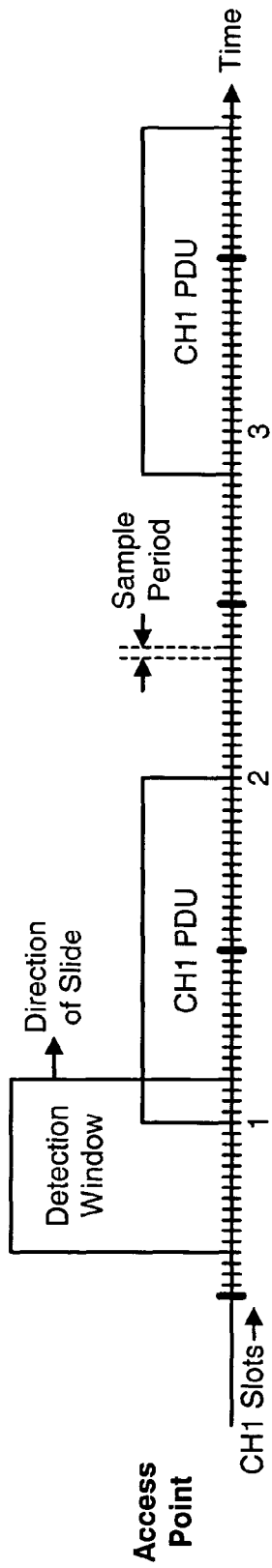
FIGS. 11A and 11B show the receiver processing for Channels 1 and 2, respectively.

FIG. 11A shows the receiver processing for Channel 1, which is not time-compensated. Referring back to FIG. 10A, even though the transmitter units attempt to transmit on specific CH1 slots, the CH1 transmissions are not time-compensated and the resultant behavior of Channel 1 is similar to that of an unslotted channel. In this case, referring back to FIG. 11A, the receiver unit can use a sliding correlation detector to detect for CH1 transmissions, each of which may be received starting at any sample period.

The correlation detector, which may operate in the time domain, slides through the entire time span in which CH1 PDUs may be received, one sample period at a time. A detection window indicates the time period in which samples for one CH1 PDU are to be processed by the detector. This detection window may be initialized to the start of the first CH1 slot and would then slide forward one sample period at a time. For each sample period, which corresponds to a hypothesis, the correlation detector processes the samples within the detection window to determine a metric for a CH1 PDU hypothesized to have been received starting at that sample period. If the metric exceeds a CH1 threshold, then the CH1 PDU is further decoded to recover the CH1 message. The metric may relate to signal energy or some other parameter. The CH1 threshold may be fixed or adaptive (e.g., dynamically determined based on the samples within the detection window).

Figure 5:
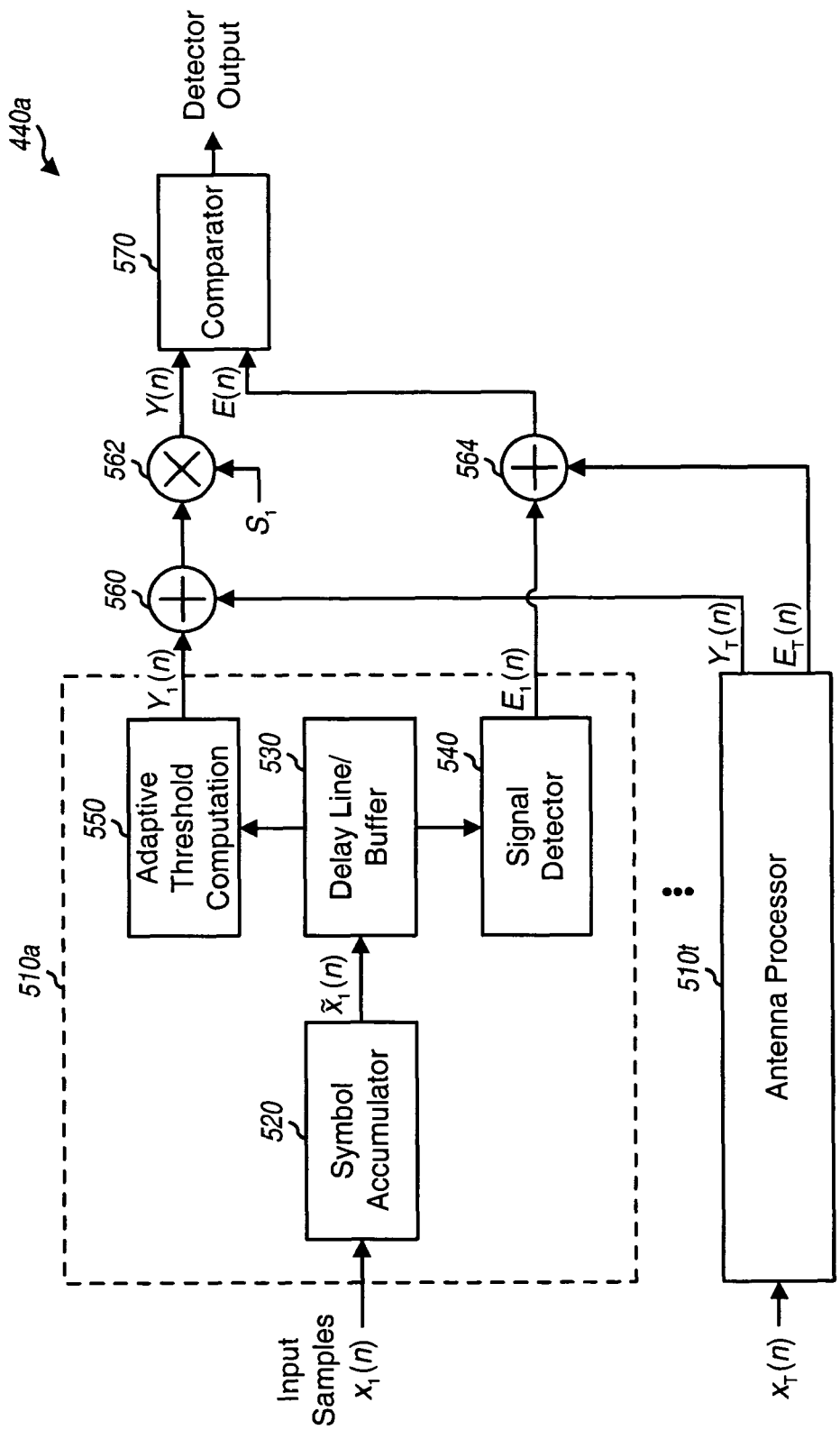
FIG. 5 shows a correlation detector.

FIG. 5 shows a block diagram of a correlation detector 440a, which is one embodiment of detector 440 in FIG. 4. The samples $\tilde{x}_i(n)$ for each of the T receive antennas are provided to a respective antenna processor 510. Within each processor 510, a symbol accumulator 520 receives and accumulates the samples for the current hypothesis and provides accumulated samples $\tilde{x}_i(n)$ to a delay line/buffer 530. For the CH1 PDU shown in FIG. 2A, symbol accumulator 520 performs accumulation of the P pilot OFDM symbols, where the accumulation is performed on a per sample basis, to provide an accumulated pilot OFDM symbol having M samples. Delay line/buffer 530 provides storage for N of the M samples and effectively discards M−N samples for the cyclic prefix. These N samples are for the transformed symbol corresponding to the accumulated pilot OFDM symbol.

A signal detector 540 then determines a metric for the accumulated pilot OFDM symbol. In an embodiment and as described below, the metric relates to the signal energy of the N samples for the accumulated pilot OFDM symbol. However, other metrics may also be used, and this is within the scope of the invention. An adaptive threshold computation unit 550 determines an adaptive threshold value $Y_i(n)$ to use to decide whether or not a CH1 transmission was received. A summer 560 sums the threshold values for all T antennas to provide a combined threshold value $Y_{tot}(n)$, which is further scaled with a scaling factor $S_1$ by a multiplier 562 to obtain a final threshold value $Y(n)$. A summer 564 sums the metric values for all T antennas to provide a final metric value $E(n)$, which is then compared against the final threshold value $Y(n)$ by a comparator 570. The detector output would indicate that a CH1 PDU was received if $E(n) > Y(n)$, and that no CH1 PDU was received otherwise.

Figure 6:
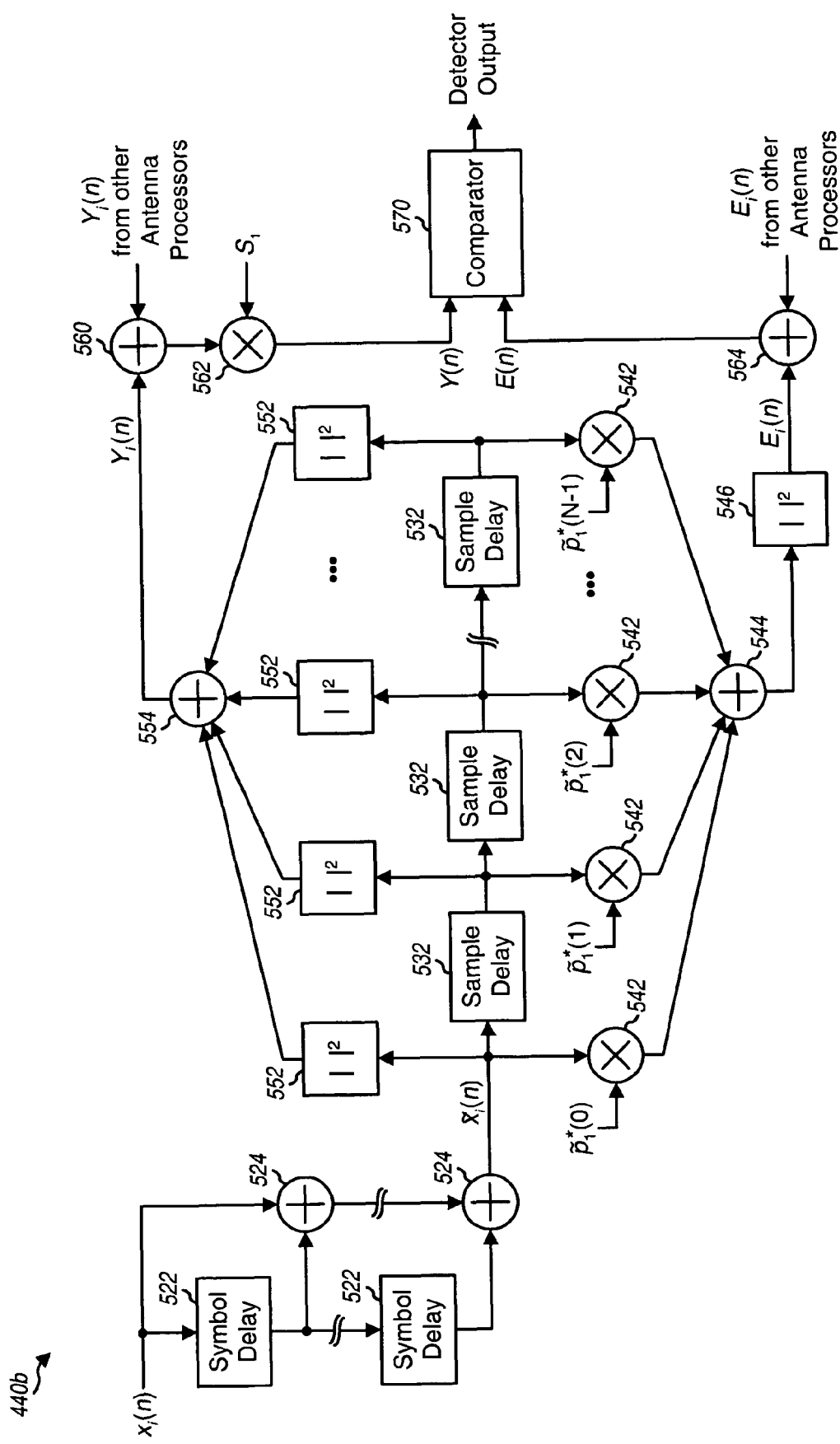
FIG. 6 shows an embodiment of the correlation detector.

FIG. 6 shows a block diagram of a correlation detector 440b, which is one embodiment of detector 440a in FIG. 5. The samples $x_i(n)$ for each receive antenna are provided to symbol accumulator 520, which is implemented with P−1 delay units 522 and P−1 summers 524. Each delay unit 522 provides one OFDM symbol (i.e., M samples) of delay. The P−1 summers 524 perform accumulation of the P pilot OFDM symbols on a per sample basis, and the last summer provides the samples $\tilde{x}_i(n)$ for the accumulated pilot OFDM symbol. The samples $\tilde{x}_i(n)$ may be expressed as:

$$\tilde{x}_i(n) = \sum_{j=0}^{P-1} x_i(n - jM), \text{ for } i \in \{1 \ldots T\}. \qquad \text{Eq (1)}$$

The samples $\tilde{x}_i(n)$ are provided to delay line/buffer 530, which is implemented with N−1 delay units 532, each of which provides one sample period of delay.

Signal detector 540 performs correlation of the accumulated pilot OFDM symbol with the known pilot OFDM symbol and determines the metric value $E_i(n)$ for the accumulated pilot OFDM symbol. Each of the N samples for the accumulated pilot OFDM symbol is provided to a respective multiplier 542, which also receives a corresponding conjugated pilot sample $\tilde{p}_1^*(j)$, where $j \in \{0 \ldots N-1\}$. To obtain $\{\tilde{p}_1^*(j)\}$, the set of pilot symbols $\{p_1(k)\}$ for the pilot subbands and zero signal values for the unused subbands (e.g., as shown in Table 1) are transformed to the time domain using an N-point IFFT to obtain N pilot samples, $\tilde{p}_1(0)$ through $\tilde{p}_1(N-1)$, which are then conjugated and provided to N multipliers 542. Each multiplier 542 multiplies its sample $\tilde{x}_i(n-j)$ with its conjugated pilot sample $\tilde{p}_1^*(j)$ and provides the result to a summer 544. Summer 544 sums the results from all N multipliers 542 and provides the summed result to a unit 546. Unit 546 determines the squared magnitude of the summed result, which is provided as the metric value $E_i(n)$. The metric value for each antenna may be expressed as:

$$E_i(n) = \left| \sum_{j=0}^{N-1} \tilde{p}_1^*(j) \cdot \tilde{x}_i(n-j) \right|^2, \text{ for } i \in \{1 \ldots T\}. \qquad \text{Eq (2)}$$

Summer 564 receives and sums the metric values for all T antennas to provide the final metric value E(n), which may be expressed as:

$$E(n) = \sum_{i=1}^{T} E_i(n). \qquad \text{Eq (3)}$$

Threshold computation unit 550 determines an adaptive threshold to use for the detection of CH1 PDU for the current hypothesis. Each of the N samples for the accumulated pilot OFDM symbol is provided to a respective unit 552, which determines the squared magnitude of the sample. A summer 554 then sums the squared magnitudes from all N units 552 to provide the threshold value $Y_i(n)$. Summer 560 receives and sums the threshold values for all T antennas to provide the combined threshold value $Y_{tot}(n)$, which may be expressed as:

$$Y_{tot}(n) = \sum_{i=1}^{T} \sum_{j=0}^{N-1} |\tilde{x}_i(n-j)|^2. \qquad \text{Eq (4)}$$

Multiplier 562 then scales the combined threshold value with the scaling factor $S_1$ to provide the final threshold value, which may be given as $Y(n) = S_1 \cdot Y_{tot}(n)$.

Comparator 570 compares the final metric value E(n) against the final threshold value Y(n) and provides the detector output D(n), which may be expressed as:

$$D(n) = \begin{cases} \text{"CH1 PDU present"} & \text{if } E(n) > Y(n), \\ \text{"CH1 PDU not present"} & \text{otherwise.} \end{cases} \qquad \text{Eq (5)}$$

If a CH1 PDU is detected, then the OFDM symbol timing is set at the time instant of the CH1 PDU detection (i.e., at the specific value of n when the CH1 PDU is detected).

The scaling factor $S_1$ is a positive constant selected to provide (1) a particular missed detection probability, which is the probability of not detecting a CH1 PDU that has been transmitted, and (2) a particular false alarm rate, which is the probability of falsely indicating that a CH1 PDU was received when in fact none was transmitted. It is desirable to have the missed detection probability be less than the message error rate (MER), so that the MER is dictated by the received SNR and other parameters and not by the detector. The MER may be specified for Channel 1, for example, to be 1 percent or less. The detector output may be used to determine whether or not to process the received CH1 PDU to recover the transmitted CH1 message. The determination as to whether the CH1 message is decoded correctly or in error may be made based on a CRC value included in the message.

For a given received CH1 PDU, it may be possible for the correlation detector to declare multiple detections. This is because a detection may be declared with noise in one or more OFDM symbols and signal in the other OFDM symbols for the CH1 PDU being detected. For example, when P=2, a first detection may occur with noise in OFDM symbol 1 and signal in OFDM symbol 2, and a second detection with a larger final metric value will occur when the second signal OFDM symbol arrives one OFDM symbol period later. Thus, for P>1, the detector may be operated to continue to detect for the CH1 PDU for an additional P−1 OFDM symbol periods to find the largest final metric value for the PDU. The OFDM symbol timing is then set by the detection with the largest final metric value and the RTD is also computed based on the time associated with this detection.

The detection processing may be performed independently of the message processing, i.e., the detection processing can continue in the normal manner regardless of whether or not CH1 PDUs are detected. Thus, if a CH1 PDU is initially detected at sample period n−j with a final metric value of E(n−j) and another CH1 PDU is later detected at sample period n with a final metric value of E(n), where E(n)>E(n−j) and j is smaller than the size of the detection window, then the current message processing for the CH1 PDU detected at sample period n−j may be halted and the CH1 PDU detected at sample period n may be processed instead.

Figure 11B:
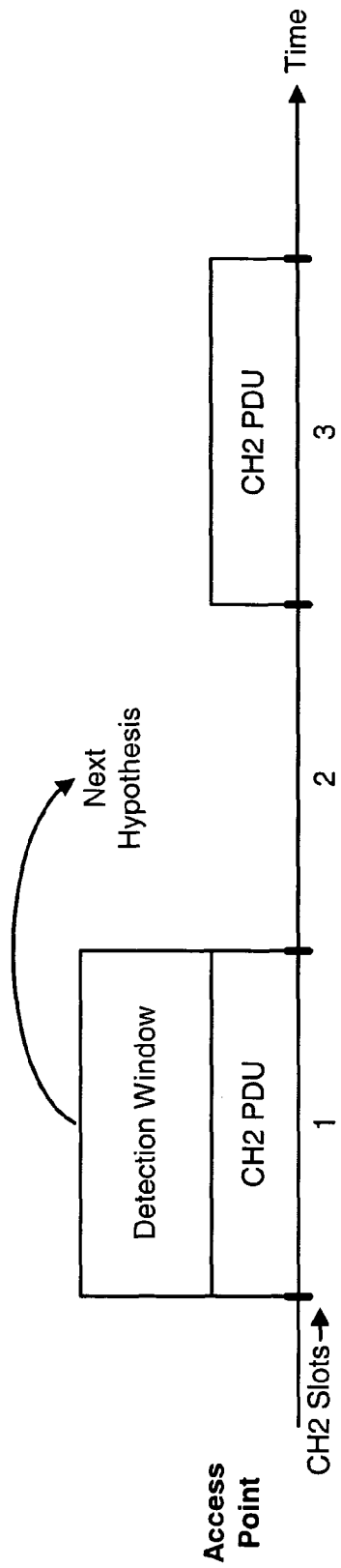

FIG. 11B shows the receiver processing for Channel 2, which is time-compensated. Referring back to FIG. 10B, the transmitter units transmit on specific CH2 slots and the CH2 transmissions are time-compensated to arrive at the receiver unit at the selected CH2 slot boundaries. In this case, referring back to FIG. 11B, the receiver unit can detect for CH2 transmissions in each CH2 slot (instead of each sample period), and the detection window can move from slot to slot. For each CH2 slot, which corresponds to a hypothesis, the decision-directed detector processes the samples received within the detection window to determine a metric for a CH2 PDU hypothesized to have been received in that slot. If the metric exceeds a CH2 threshold, then the CH2 PDU is deemed to have been received.

Figure 7:
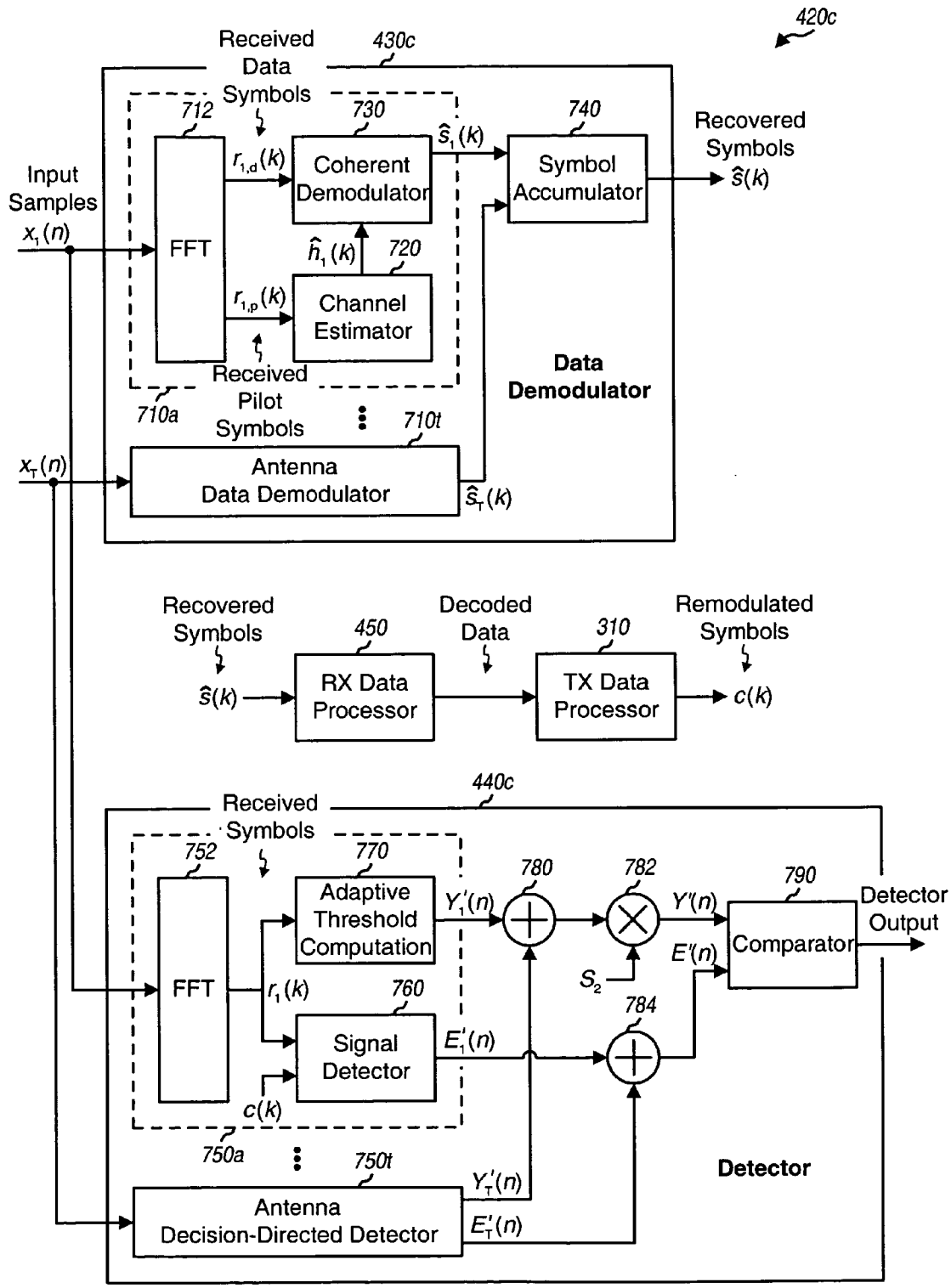
FIG. 7 shows a detector/data demodulator that includes a data demodulator and a decision-directed detector.

FIG. 7 shows a block diagram of an embodiment of a detector/data demodulator 420c, which may also be used for unit 420 in FIG. 4. Detector/data demodulator 420c includes a data demodulator 430c used to perform coherent demodulation and a decision-directed detector 440c used to detect for CH2 PDUs. The samples for each of the T receive antennas are provided to a respective antenna demodulator 710 within data demodulator 430c and to a respective decision-directed detector 750 within detector 440c.

Each antenna demodulator 710 performs coherent demodulation for one antenna for one received OFDM symbol at a time. For each received OFDM symbol, an FFT unit 712 receives the samples $x_i(n)$ for the OFDM symbol, removes the cyclic prefix to obtain the transformed symbol, and performs a fast Fourier transform (FFT) on the transformed symbol to provide N received symbols $r_i(k)$, which include received data symbols $r_{i,d}(k)$ and received pilot symbols $r_{i,p}(k)$. A channel estimator 720 then estimates the channel response of the data subbands based on the received pilot symbols $r_{i,p}(k)$. A demodulator 730 performs coherent demodulation of the received data symbols with the channel estimates to provide recovered data symbols $\hat{s}_i(k)$.

A symbol accumulator 740 receives and accumulates the recovered data symbols from demodulators 710a through 710t for the T receive antennas and provides recovered symbols $\hat{s}(k)$. RX data processor 450 then processes the recovered symbols $\hat{s}(k)$, as described above for FIG. 4, to provide the decoded data. In an embodiment, the CH2 message does not include a CRC, and the CRC check is not performed by the RX data processor. A TX data processor 310 then processes the decoded data to provide remodulated symbols c(k), which are estimates of the transmitted data symbols s(k) The processing by processor 310 includes encoding, interleaving, and symbol mapping, as described above for FIG. 3A. The processing by RX data processor 450 is often referred to as simply "decoding", and the processing by TX data processor 310 is often referred to as "re-encoding".

Each decision-directed detector 750 performs detection for one received OFDM symbol at a time. For each received OFDM symbol, an FFT unit 752 receives the samples $x_i$ (n) for the OFDM symbol and performs an FFT on the corresponding transformed symbol to provide N received symbols $r_i(k)$. FFT units 712 and 752 are typically implemented with one FFT unit, but are shown as two units in FIG. 7 for clarity.

A signal detector 760 then processes the received pilot and data symbols with their expected symbols to provide a metric $E_i'(n)$ for the OFDM symbol being processed. An adaptive threshold computation unit 770 determines an adaptive threshold value $Y_i'(n)$ used to decide whether or not a CH2 PDU was received. A summer 780 sums the threshold values for all T antennas to provide a combined threshold value $Y_{tot}'(n)$, which is further scaled with a scaling factor $S_2$ by a multiplier 782 to obtain a final threshold value Y'(n). A summer 784 sums the metric values for all T antennas to provide the final metric value E'(n), which is then compared against the final threshold value Y'(n) by a comparator 790. The detector output would indicate that a CH2 PDU was received if E'(n)>Y'(n), and that no CH2 PDU was received otherwise.

Figure 8A:
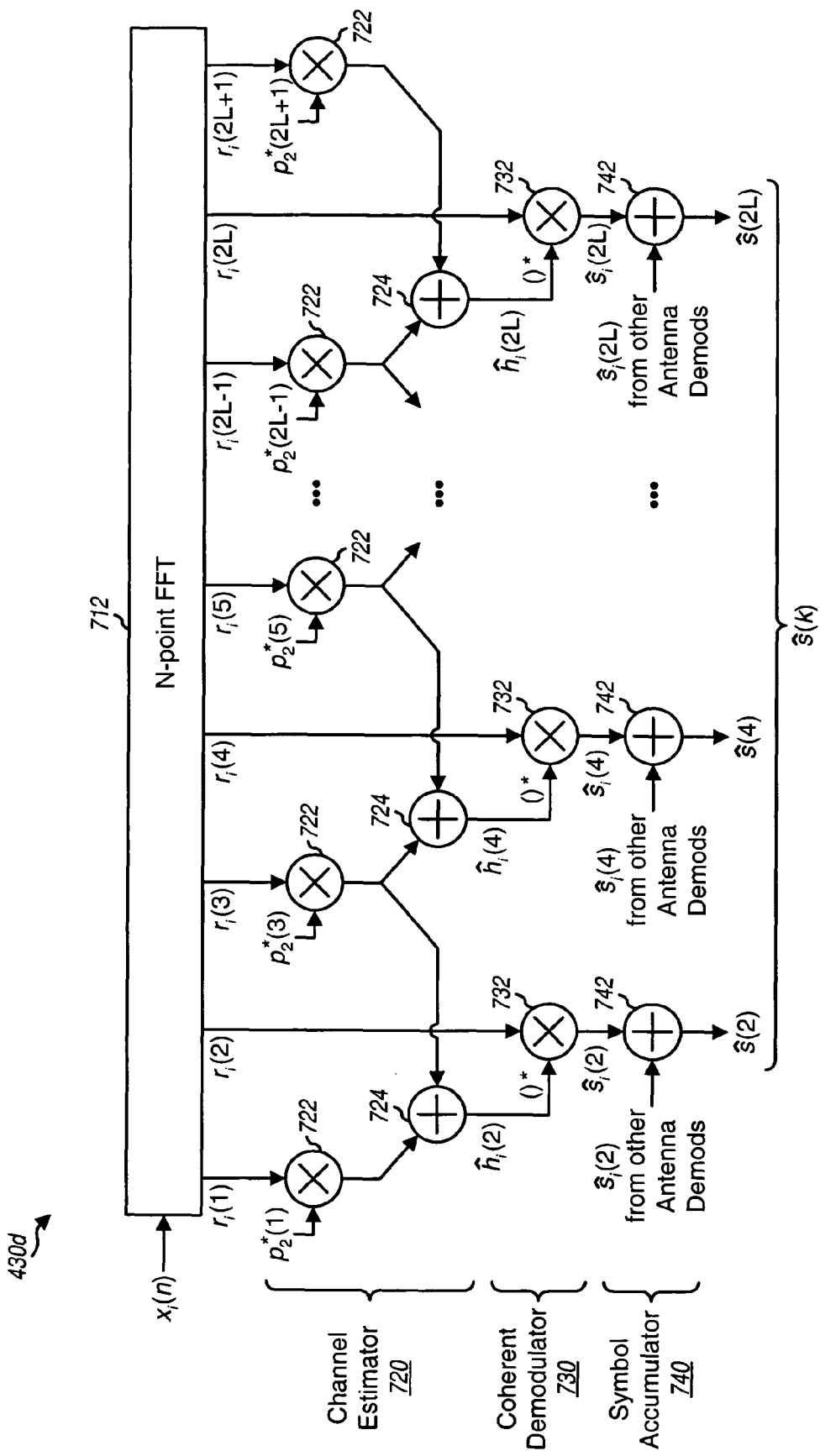
FIG. 8A shows an embodiment of the data demodulator.

FIG. 8A shows a block diagram of a data demodulator 430d, which is one embodiment of data demodulator 430c in FIG. 7. The samples $x_i$ (n) for each receive antenna are transformed by FFT unit 712 to provide N received symbols $r_i(k)$ for each transformed symbol. For the embodiment shown in Table 1, the N received symbols include 28 received pilot symbols for 28 pilot subbands, 24 received data symbols for 24 data subbands, and 12 additional symbols for the 12 unused subbands. For simplicity, the following description is for the embodiment shown in FIG. 2B whereby the N received symbols include L+1 received pilot symbols for L+1 pilot subbands and L received data symbols for L data subbands, where each data subband is flanked on both sides by pilot subbands, and the subband index k for the pilot and data subbands is defined as k∈K where K={1 ... 49}.

Coherent demodulation of each of the L data subbands is performed by first forming an estimate of the channel response for the data subband using the two pilot subbands flanking the data subband. The channel estimate $\hat{h}_i(k)$ for the k-th data subband may be obtained by combining the channel estimates for the two flanking pilot subbands, which may be expressed as:

$$\hat{h}_i(k) = \hat{h}_i(k-1) + \hat{h}_i(k+1) \qquad \text{Eq (1)}$$
$$= p_2^*(k-1)r_i(k-1) + p_2^*(k+1)r_i(k+1),$$
$$\text{for } k \in K_d \text{ and } i \in \{1 \ldots T\},$$

where $p_2^*(k)$ is the conjugate of the pilot symbol transmitted on the k-th subband for Channel 2 and $K_d$ represents the set of data subbands, i.e., $K_d \in \{2, 4, \ldots 2L\}$.

The recovered data symbol $\hat{s}_i(k)$ for each data subband may then be expressed as:

$$\hat{s}_i(k) = \hat{h}_i^*(k) \cdot r_i(k), \text{ for } k \in K_d \text{ and } i \in \{1 \ldots T\}. \qquad \text{Eq (7)}$$

The recovered data symbols for all T receive antennas for each data subband may then be obtained as:

$$\hat{s}(k) = \sum_{i=1}^{T} \hat{s}_i(k), \text{ for } k \in K_d. \qquad \text{Eq (8)}$$

In FIG. 8A, the channel estimation shown in equation (6) is performed by L+1 multipliers 722 and L summers 724. Each multiplier 722 multiplies the received symbol for a respective pilot subband with the conjugate of the known pilot symbol for that subband to provide the channel estimate for the pilot subband. Each summer 724 then sums the channel estimates for the two pilot subbands flanking the associated data subband to provide the channel estimate for that data subband. The channel estimates for the L data subbands may also be obtained based on interpolation or some other manners, and this is within the scope of the invention.

The coherent demodulation shown in equation (7) is performed by L multipliers 732. Each multiplier 732 multiplies the received symbol $r_i(k)$ for a respective data subband with the conjugate of the channel estimate, $\hat{h}_i^*(k)$, for that subband to provide the recovered data symbol $\hat{s}_i(k)$ for the data subband. Sample accumulation for all T receive antennas, as shown in equation (8), is performed by L summers 742. Each summer 742 receives and sums T recovered data symbols $\hat{s}_i(k)$ for the T receive antennas for the associated data subband to provide the recovered symbol $\hat{s}(k)$ for that subband.

As noted above, the subband multiplexing may be such that each group of Q data subbands is flanked on both sides by pilot subbands, where Q may be greater than one. If Q>1, then coherent demodulation may be performed in several manners. In one embodiment, the received pilot symbol for each pilot subband is used as a coherent reference for the two adjacent data subbands, and the received data symbols for these data subbands may be coherently demodulated based on this received pilot symbol. Hard decisions may then be obtained and used to remove the modulation from the just-detected data symbols to obtain improved channel estimates for the next two data subbands. The demodulation process can start from the end data subbands (i.e., next to the pilot subbands) and work towards the middle data subband. Improved channel estimates for the data subbands further away from the pilot subbands may be obtained as each pair of received data symbols is detected. In another embodiment, the received pilot symbols for each pair of pilot subbands are interpolated to obtain the channel estimate for each of the Q data subbands flanked by these pilot subbands.

A CRC value is often used to determine whether a received message was decoded correctly or in error. In certain instances, it may not be desirable to include a CRC value in a message because of the overhead associated with the CRC value and/or some other consideration. In this case, another mechanism is needed to determine whether or not the received message is valid. For the embodiment shown in FIG. 7, data demodulator 430c and RX data processor 450 may be operated to provide a decoded message for each hypothesis, and detector 440c may be operated to provide an indication as to whether or not a message was received for the hypothesis.

Figure 8B:
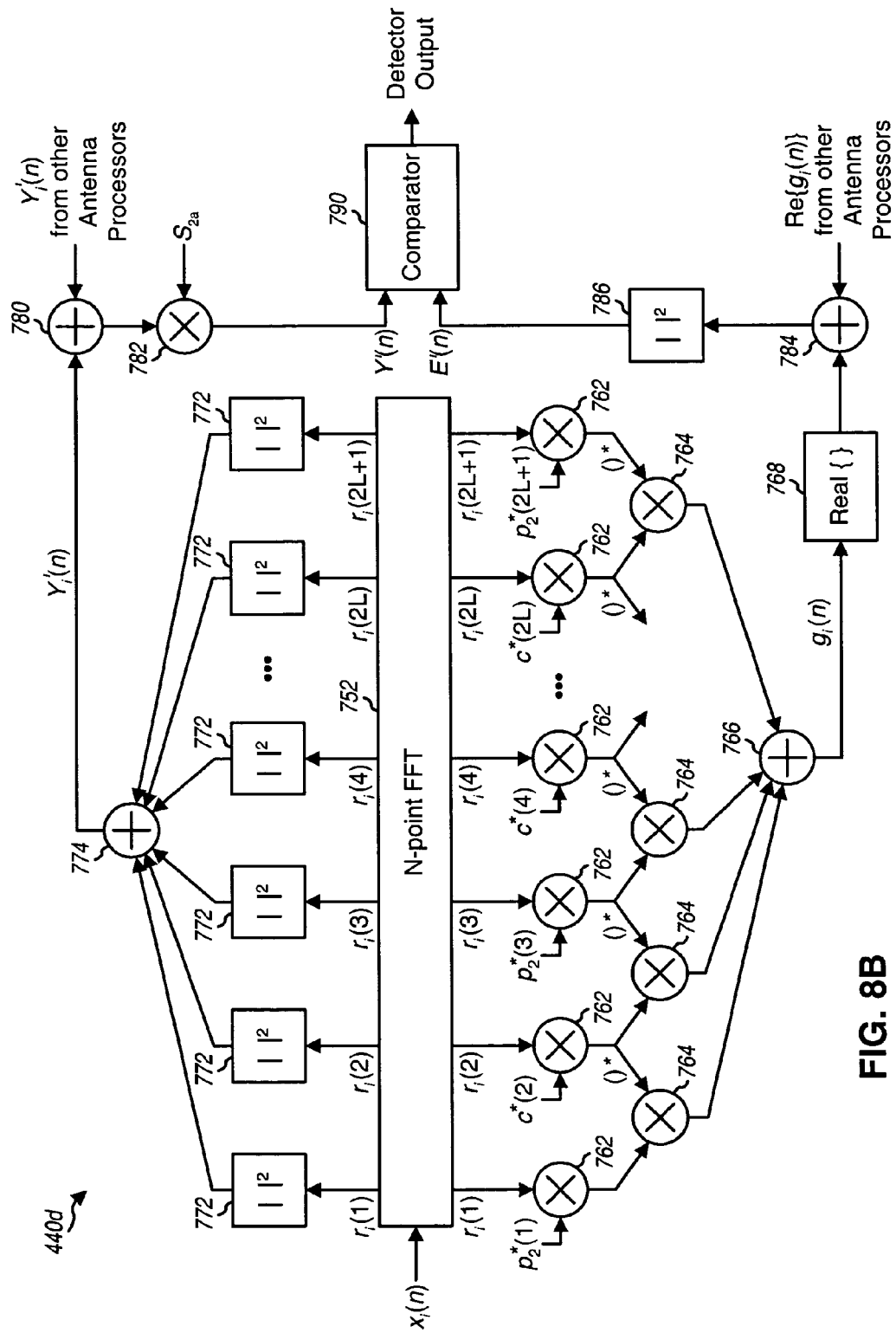
FIG. 8B shows a decision-directed detector that performs differential detection in the frequency domain.

FIG. 8B shows a block diagram of a decision-directed detector 440d that performs differential detection in the frequency domain and is one embodiment of detector 440c in FIG. 7. The samples $x_i(n)$ for each receive antenna are transformed by FFT unit 752 to provide N received symbols $r_i(k)$ for each transformed symbol.

To determine the metric value E'(n) for each transformed symbol, a detection statistic $g_i(n)$ is first obtained for each receive antenna by summing over the real part of 2L dot products formed by using adjacent pairs of pilot and data subbands. The detection statistic $g_i(n)$ may be expressed as:

$$g_i(n) = \sum_{k=1}^{2L} z(k) \cdot z^*(k+1) \text{ for } i \in \{1 \ldots T\}, \text{ where} \quad \text{Eq (9a)}$$

$$z_i(k) = \begin{cases} r_i(k) \cdot p_2^*(k) & \text{for } k \in \{1, 3, \ldots 2L+1\} \\ r_i(k) \cdot c^*(k) & \text{for } k \in \{2, 4, \ldots 2L\} \end{cases} \quad \text{Eq (9b)}$$

The metric value E'(n) for the transformed symbol may then be expressed as:

$$E'(n) = \left| \sum_{i=1}^{T} \text{Re}\{g_i(n)\} \right|^2 \text{ for } i \in \{1 \ldots T\}. \quad \text{Eq (10a)}$$

Alternatively, the metric value E'(n) may be expressed as:

$$E'(n) = \sum_{i=1}^{T} |\text{Re}\{g_i(n)\}|^2 \text{ for } i \in \{1 \ldots T\}. \quad \text{Eq (10b)}$$

In FIG. 8B, the computation of the detection statistic $g_i(n)$ shown in equation (9) is performed by 2L+1 multipliers 762, 2L multipliers 764, and a summer 766. Each multiplier 762 multiplies the received symbol for an associated pilot or data subband with the conjugate of the known pilot symbol or remodulated symbol for that subband. Each multiplier 764 performs a dot product of the outputs from a pair of multipliers 762 for a pair of adjacent pilot and data subbands. Summer 766 then sums the outputs from L multipliers 764 to provide the detection statistic $g_i(n)$. For the embodiment shown in equation (10a), a unit 768 receives $g_i(n)$ and provides the real part to summer 784, which sums the real part of $g_i(n)$ for all T antennas. The output from summer 784 is then squared by a unit 786 to provide the metric value E'(n). For the embodiment shown in equation (10b), unit 786 may be placed between unit 768 and summer 784.

Adaptive threshold computation unit 770 determines the adaptive threshold Y'(n) to use for each received transformed symbol. Each of the 2L+1 received symbols $r_i(k)$ for the pilot and data subbands is provided to a respective unit 772, which determines the squared magnitude of the symbol. A summer 774 then sums the squared magnitude from all 2L+1 units 772 to provide the threshold value $Y_i'(n)$. Summer 780 receives and sums the threshold values for all T antennas to provide the combined threshold value $Y_{tot}'(n)$, which may be expressed as:

$$Y_{tot}'(n) = \sum_{i=1}^{T} \sum_{k=1}^{2L+1} |r_i(k)|^2. \quad \text{Eq (11)}$$

Multiplier 782 scales the combined threshold value with a scaling factor $S_{2a}$ to provide the final threshold value, which may be given as $Y'(n) = S_{2a} \cdot Y_{tot}'(n)$. In general, the threshold value Y'(n) and metric value E'(n) are each accumulated over the duration of the PDU to be detected. Thus, if the PDU spans multiple OFDM symbol periods, then the threshold and metric values are first computed as described above for each of these OFDM symbols and then accumulated to provide the final threshold and metric values for the PDU.

Comparator 790 compares the final metric value E'(n) against the final threshold value Y'(n) and provides the detector output D'(n), which may be expressed as:

$$D'(n) = \begin{cases} \text{"CH2PDU present"} & \text{if } E'(n) > Y'(n), \\ \text{"CH2PDU not present"} & \text{otherwise.} \end{cases} \quad \text{Eq (12)}$$

If the detector output D'(n) indicates that a CH2 PDU is present, then the CH2 message decoded by the RX data processor is deemed to be valid and may be further processed by a controller as appropriate. Otherwise, the CH2 message is discarded.

Figure 8C:
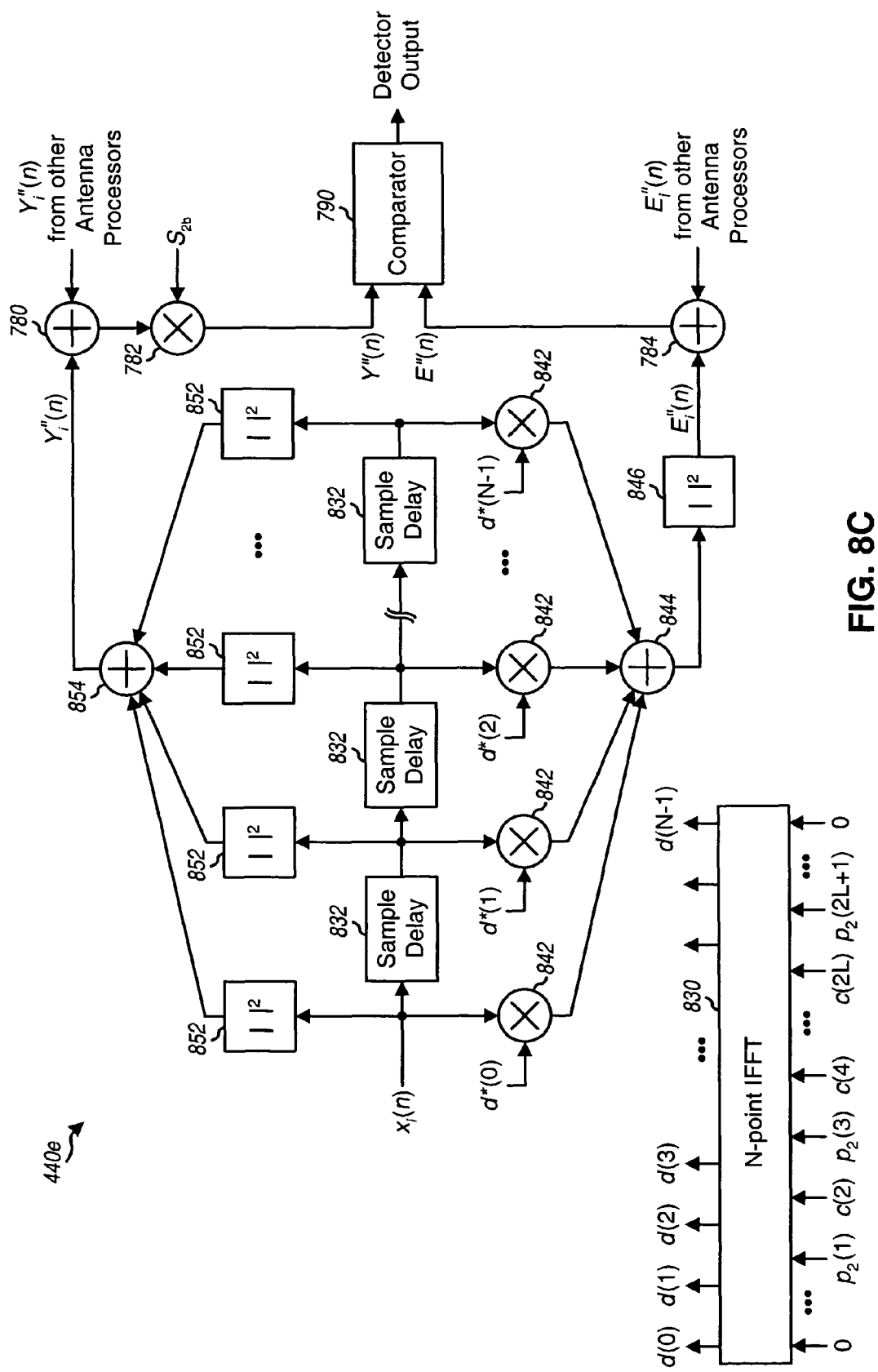
FIG. 8C shows a decision-directed detector that performs coherent detection in the time domain.

FIG. 8C shows a block diagram of a decision-directed detector 440e that performs coherent detection in the time domain and is another embodiment of detector 440c in FIG. 7. The samples $x_i(n)$ for each receive antenna are provided to a delay line/buffer 831 that is implemented with N−1 delay units 832, each of which provides one sample period of delay.

Detector 440e performs correlation of each received OFDM symbol with its corresponding "reconstructed" OFDM symbol to determine the metric E"(n) for the received OFDM symbol. Each of the N samples $x_i(n)$ for the received OFDM symbol is provided to a respective multiplier 842, which also receives a corresponding conjugated reconstructed sample d*(j), where j∈{0 . . . N−1}. To obtain d*(j), the pilot symbols $p_2(k)$ for the pilot subbands (e.g., as shown in Table 1), remodulated symbols c(k) for the data subbands, and zero signal values for the unused subbands (i.e., N symbols for the N total subbands) for an OFDM symbol period are transformed to the time domain by an N-point IFFT 830 to obtain N reconstructed samples, d(0) through d(N−1), which are then conjugated and provided to N multipliers 842. The operations performed by the other elements in FIG. 8C are as described above for FIG. 6. The metric value $E_i"(n)$ for each antenna may be expressed as:

$$E_i''(n) = \left| \sum_{j=0}^{N-1} d^*(j) \cdot x_i(n-j) \right|^2, \text{ for } i \in \{1 \ldots T\}. \quad \text{Eq (13)}$$

The final metric value E'(n) for all T antennas may then be expressed as:

$$E''(n) = \sum_{i=1}^{T} E_i''(n). \quad \text{Eq (14)}$$

The threshold Y"(n) to use for comparing against the final metric value E"(n) may be determined as described above for FIG. 6. In particular, the combined threshold value $Y_{tot}"(n)$ for all T antennas may be expressed as:

$$Y_{tot}''(n) = \sum_{i=1}^{T} \sum_{j=0}^{N-1} |x_i(n-j)|^2. \quad \text{Eq (15)}$$

The final threshold value may then be given as $Y''(n) = S_{2b} \cdot Y_{tot}''(n)$.

For the decision-directed detector, the scaling factor $S_2$ (which is $S_{2a}$ for detector 440d in FIG. 8B and $S_{2b}$ for detector 440e in FIG. 8C) is a positive constant selected to provide (1) a particular missed detection probability for CH2 PDUs and (2) a particular false alarm rate for incorrectly declaring the presence of CH2 PDUs. If CH2 messages are defined such that they do not include CRC values, then the detector is relied upon exclusively to determine whether or not CH2 messages are present. Erroneous CH2 messages may be provided to the controller due to the following:

false alarm—noise in the received signal falsely triggers detection; and incorrect decode—signal correctly triggers detection but the decoded CH2 message includes uncorrected and undetected errors.

If Channel 2 is used as a random access channel, then a false alarm for a CH2 PDU may cause the system to assign resources to a non-existent user terminal, which then results in wasted resources. In that case, it is desirable to select the scaling factor $S_2$ to minimize the false alarm probability since it is undesirable to have noise frequently triggering a waste of resources.

The incorrect decode probability is related to the detection probability, and a higher detection probability can lead to more incorrect decode events. When an incorrect decode event occurs, an erroneously decoded CH2 message is provided to the controller. The controller may be able to check the validity of the CH2 message in some other manner. For example, if the CH2 message includes a unique identifier for the user terminal that transmitted the message, then the controller can check to see if the unique identifier for the recovered CH2 message is included in a list of valid identifiers. If the unique identifier in the received CH2 message is determined to be valid, then the system can assign resources to the user terminal associated with that identifier.

In selecting the scaling factor $S_2$, it may be desirable to detect as many valid CH2 messages as possible while maintaining the false alarm rate and incorrect decode probability to below a particular level. It is also possible to vary the scaling factor $S_2$ based on system loading. For example, if the system load is low and there are few valid identifiers, then the likelihood of the system erroneously allocating resources is smaller. In this case, a lower detection threshold may be used. As the system load increases, the detection threshold may be increased to reduce the rate of incorrect decode events.

Figure 9:
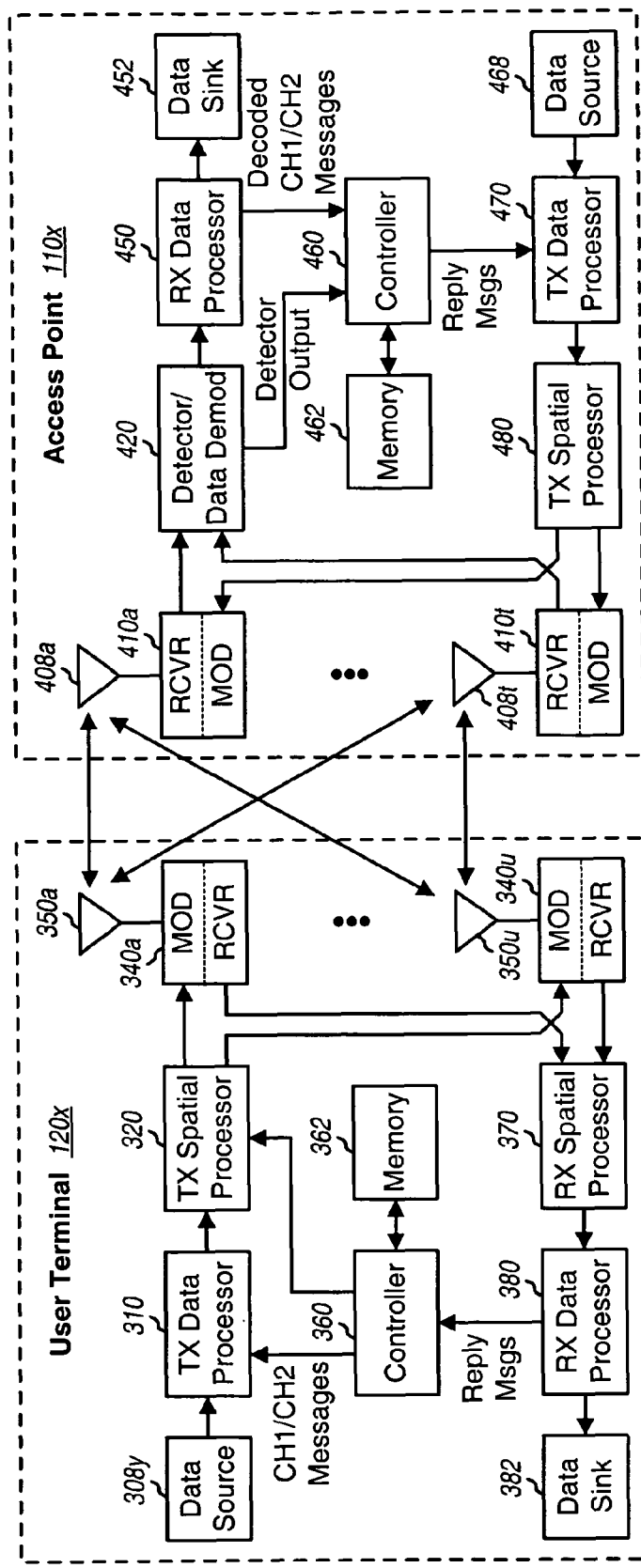
FIG. 9 shows a block diagram of an access point and a user terminal.

FIG. 9 shows a block diagram of an embodiment of an access point 110x and a user terminal 120x in system 100. For this embodiment, access point 110x and user terminal 120x are each equipped with multiple antennas. In general, the access point and user terminal may each be equipped with any number of transmit/receive antennas.

On the uplink, at user terminal 120x, TX data processor 310 receives and processes traffic data from a data source 308 and other data (e.g., for CH1 and CH2 messages) from a controller 360 to provide multiplexed data and pilot symbols, as described above for FIG. 3A. TX spatial processor 320 may perform spatial processing on the pilot and data symbols to provide a stream of transmit symbols for each antenna. Each modulator 340 receives and processes a respective transmit symbol stream to provide a corresponding uplink modulated signal, which is then transmitted from an associated antenna 350.

At access point 110x, T antennas 408a through 408t receive the transmitted uplink modulated signals from the user terminal, and each antenna provides a received signal to a respective receiver 410. Each receiver 410 conditions the received signal and further digitizes the conditioned signal to provide samples. Detector/data demodulator 420 then performs processing to detect for CH1 and CH2 messages, as described above. RX data processor 450 processes recovered symbols to provide decoded traffic data (which may be provided to a data sink 452 for storage) and recovered CH1 and CH2 messages (which may be provided to a controller 460 for further processing).

The processing for the downlink may be the same or different from the processing for the uplink. Data from a data source 468 and signaling (e.g., reply messages) from controller 460 are processed (e.g., coded, interleaved, and modulated) by a TX data processor 470 and may be spatially processed by a TX spatial processor 480. The transmit symbols from TX spatial processor 480 are then processed by modulators 410a through 410t to generate T downlink modulated signals, which are transmitted via antennas 408a through 408t.

At user terminal 120x, the downlink modulated signals are received by antennas 350, conditioned and digitized by receivers 340, and processed by an RX spatial processor 370 and an RX data processor 380 in a complementary manner to that performed at the access point. The decoded data for the downlink may be provided to a data sink 382 for storage and/or controller 360 for further processing.

Controllers 360 and 460 control the operation of various processing units at the user terminal and the access point, respectively. Memory units 362 and 462 store data and program codes used by controllers 360 and 460, respectively.

For clarity, specific embodiments of the correlation and decision-directed detectors, demodulators, and the receiver units have been described for specific PDU formats. Various other embodiments and uses for these detectors are also possible, and this is within the scope of the invention. For example, the correlation detector may be used for a channel whereby transmissions are time-compensated, and the decision-directed detector may be used for a channel whereby transmissions are not time-compensated.

The decision-directed detector may be implemented in the frequency domain (as shown in FIG. 8B) or the time domain (as shown in FIG. 8C). Moreover, the decision-directed detector may be used for various PDU formats. For example, the decision-directed detector may be used for a PDU format whereby data and pilot are subband multiplexed (as described above for CH2 PDU), a PDU format whereby data and pilot are time division multiplexed (TDM) (as described above for CH1 PDU), and others. The decision-directed detector may also be used with or without the pilot. In general, the decision-directed detector uses frequency-domain received data symbols or time-domain reconstructed data samples to detect for data transmissions in the received signal. This detector may advantageously be used when CRC or other error detection mechanisms are not available to detect for message errors.

The use of an adaptive threshold can provide robust detection performance in many operating scenarios, such as for an unlicensed frequency band where various sources of interference may be present. The threshold may be set based on a particular statistic for the transmission to be detected. This statistic may relate to the energy of the desired signal plus noise and interference in the transmission or some other parameter.

The detectors, demodulators, and receivers described herein may be used for various types of transport channels. For example, these units may be used for different types of random access channels, such as the ones described in detail in the aforementioned U.S. Patent Application Ser. No. 60/432,440 and provisional U.S. Patent Application Ser. No. 60/421,309.

The detectors, demodulators, and receivers described herein may also be used for various wireless multiple-access communication systems. One such system is a wireless multiple-access MIMO system described in the aforementioned provisional U.S. Patent Application Ser. No. 60/421,309. In general, these systems may or may not employ OFDM, or may employ some other multi-carrier modulation scheme instead of OFDM, and may or may not utilize MIMO.

The detectors, demodulators, and receivers described herein may be implemented by various means. For example, these units may be implemented in hardware, software, or a combination thereof. For a hardware implementation, the detectors and receivers may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the signal processing for the detectors, demodulators, and receivers may be implemented with modules (e.g., procedures, functions, and so on) that perform the functions described herein. The software codes may be stored in a memory unit (e.g., memory units 362 and 462 in FIG. 9) and executed by a processor (e.g., controllers 360 and 460). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver unit in a wireless communication system, comprising:
    a signal detector operative to determine a metric for a data transmission hypothesized to have been received;
    a threshold computation unit operative to determine a threshold based on the hypothesized data transmission; and
    a comparator operative to receive the metric and the threshold and provide an output indicating whether or not the data transmission is deemed to have been received.

2. The receiver unit of claim 1, wherein the threshold is determined based on received pilot symbols for the hypothesized data transmission.

3. The receiver unit of claim 2, wherein the threshold is further determined based on received data symbols for the hypothesized data transmission.

4. The receiver unit of claim 1, wherein the metric relates to signal energy of the hypothesized data transmission.

5. The receiver unit of claim 1, wherein the signal detector is operative to determine the metric based on a plurality of received signals for a plurality of antennas, and wherein the threshold computation unit is operative to determine the threshold based on the plurality of received signals.

6. A method of detecting data transmissions in a wireless multiple-access communication system, comprising:
    first processing received data symbols for a data transmission hypothesized to have been received to provide remodulated symbols that are estimates of transmitted data symbols;
    second processing the received data symbols and the remodulated symbols to provide a detector output that indicates whether or not the data transmission is deemed to have been received; and
    determining a threshold to use for the hypothesized data transmission, and wherein the detector output is further determined based on the threshold,
    wherein the second processing includes
    determining a metric based on the received data symbols and the remodulated symbols, and
    comparing the metric against the threshold, and wherein the detector output is based on the comparing.

7. The method of claim 6, wherein the first processing includes
    demodulating the received data symbols to provide recovered symbols,
    decoding the recovered symbols to provide decoded data, and
    re-encoding the decoded data to provide the remodulated symbols.

8. A method of detecting data transmissions in a wireless multiple-access communication system, comprising:
    determining a metric for a data transmission hypothesized to have been received;
    determining a threshold for the hypothesized data transmission based on samples received for the hypothesized data transmission; and
    comparing the metric against the threshold to provide an output indicating whether or not the data transmission is deemed to have been received.

9. The method of claim 8, wherein the threshold is determined based on received pilot symbols for the hypothesized data transmission.

10. The method of claim 9, wherein the threshold is further determined based on received data symbols for the hypothesized data transmission.

11. The method of claim 8, wherein the metric relates to signal energy of the hypothesized data transmission.

12. The method of claim 8, further comprising determining the metric based on a plurality of received signals for a plurality of antennas, and determining the threshold based on the plurality of received signals.

13. An apparatus in a wireless multiple-access communication system, comprising:
    means for determining a metric for a data transmission hypothesized to have been received;
    means for determining a threshold for the hypothesized data transmission based on samples received for the hypothesized data transmission; and
    means for comparing the metric against the threshold to provide an output indicating whether or not the data transmission is deemed to have been received.

14. A memory unit having software codes stored thereon for performing a method of detecting data transmissions in a wireless multiple-access communication system, the method comprising:
    determining a metric for a data transmission hypothesized to have been received;
    determining a threshold for the hypothesized data transmission based on samples received for the hypothesized data transmission; and comparing the metric against the threshold to provide an output indicating whether or not the data transmission is deemed to have been received.

15. The memory unit of claim 14, wherein the threshold is determined based on received pilot symbols for the hypothesized data transmission.

16. The memory unit of claim 15, wherein the threshold is further determined based on received data symbols for the hypothesized data transmission.

17. The memory unit of claim 14, wherein the metric relates to signal energy of the hypothesized data transmission.

18. The memory unit of claim 14, the method further comprising determining the metric based on a plurality of received signals for a plurality of antennas, and determining the threshold based on the plurality of received signals.

19. A memory unit having software codes stored thereon for performing a method of detecting data transmissions in a wireless multiple-access communication system, the method comprising:
  first processing received data symbols for a data transmission hypothesized to have been received to provide remodulated symbols that are estimates of transmitted data symbols;
  second processing the received data symbols and the remodulated symbols to provide a detector output that indicates whether or not the data transmission is deemed to have been received; and
  determining a threshold to use for the hypothesized data transmission, and wherein the detector output is further determined based on the threshold,
  wherein the second processing includes:
  determining a metric based on the received data symbols and the remodulated symbols, and
  comparing the metric against the threshold, and wherein the detector output is based on the comparing.

20. The memory unit of claim 19, wherein the first processing includes:
  demodulating the received data symbols to provide recovered symbols,
  decoding the recovered symbols to provide decoded data, and
  re-encoding the decoded data to provide the remodulated symbols.

21. An apparatus, comprising:
  a processor capable of executing instructions for performing a method of detecting data transmissions in a wireless multiple-access communication system, the method comprising:
    determining a metric for a data transmission hypothesized to have been received;
    determining a threshold for the hypothesized data transmission based on samples received for the hypothesized data transmission; and
    comparing the metric against the threshold to provide an output indicating whether or not the data transmission is deemed to have been received; and
  a memory unit communicatively coupled to the processor having the instructions stored therein.

22. The apparatus of claim 21, wherein the threshold is determined based on received pilot symbols for the hypothesized data transmission.

23. The apparatus of claim 22, wherein the threshold is further determined based on received data symbols for the hypothesized data transmission.

24. The apparatus of claim 21, wherein the metric relates to signal energy of the hypothesized data transmission.

25. The apparatus of claim 21, the method further comprising determining the metric based on a plurality of received signals for a plurality of antennas, and determining the threshold based on the plurality of received signals.

26. An apparatus, comprising:
  a processor capable of executing instructions for performing a method of detecting data transmissions in a wireless multiple-access communication system, the method comprising:
    first processing received data symbols for a data transmission hypothesized to have been received to provide remodulated symbols that are estimates of transmitted data symbols;
    second processing the received data symbols and the remodulated symbols to provide a detector output that indicates whether or not the data transmission is deemed to have been received; and
    determining a threshold to use for the hypothesized data transmission, and wherein the detector output is further determined based on the threshold;
    wherein the second processing includes determining a metric based on the received data symbols and the remodulated symbols and comparing the metric against the threshold, and wherein the detector output is based on the comparing;
  and
  a memory unit communicatively coupled to the processor having the instructions stored therein.

27. The apparatus of claim 26, wherein the first processing includes:
  demodulating the received data symbols to provide recovered symbols,
  decoding the recovered symbols to provide decoded data, and
  re-encoding the decoded data to provide the remodulated symbols.

* * * * *